US011156288B2

United States Patent
Krishnam E.N.V et al.

(10) Patent No.: US 11,156,288 B2
(45) Date of Patent: Oct. 26, 2021

(54) TRANSMISSION CONTROL MECHANISM IN A MANUAL DUAL CLUTCH POWER TRANSMISSION UNIT OF A VEHICLE

(71) Applicant: MAHINDRA AND MAHINDRA LIMITED, Tamilnadu (IN)

(72) Inventors: Raju Krishnam E.N.V, Tamilnadu (IN); Devakumar Raja Janarthan, Tamilnadu (IN); Srinivasa Rao K.V.V, Tamilnadu (IN); Amit More, Tamilnadu (IN); Kasiganesh P, Tamilnadu (IN)

(73) Assignee: MAHINDRA AND MAHINDRA LIMITED, Tamilnadu (IN)

( * ) Notice: Subject to any disclaimer, the term of this patent is extended or adjusted under 35 U.S.C. 154(b) by 300 days.

(21) Appl. No.: 16/329,265

(22) PCT Filed: Aug. 31, 2017

(86) PCT No.: PCT/IN2017/050371
§ 371 (c)(1),
(2) Date: Feb. 28, 2019

(87) PCT Pub. No.: WO2018/042456
PCT Pub. Date: Mar. 8, 2018

(65) Prior Publication Data
US 2019/0219166 A1 Jul. 18, 2019

(30) Foreign Application Priority Data
Aug. 31, 2016 (IN) .............................. 201641029834

(51) Int. Cl.
*F16H 63/20* (2006.01)
*F16D 21/04* (2006.01)
(Continued)

(52) U.S. Cl.
CPC .............. *F16H 63/20* (2013.01); *B60K 17/02* (2013.01); *B60K 20/00* (2013.01); *B60K 20/02* (2013.01);
(Continued)

(58) Field of Classification Search
CPC .. B60K 17/02; B60K 20/02; B60Y 2400/428; F16D 25/10; F16D 2021/0661;
(Continued)

(56) References Cited

U.S. PATENT DOCUMENTS

2004/0060381 A1* 4/2004 Gavillucci .............. F16H 63/14
74/473.3
2004/0220010 A1 11/2004 Williams
(Continued)

FOREIGN PATENT DOCUMENTS

JP 2012-091642 A 5/2012

OTHER PUBLICATIONS

International Search Report dated Dec. 20, 2017, corresponding to International Application No. PCT/IN2017/050371 citing the above reference(s).

*Primary Examiner* — Joseph Brown
(74) *Attorney, Agent, or Firm* — Amster, Rothstein & Ebenstein LLP

(57) ABSTRACT

Transmission control mechanism 100 in a power transmission system of a vehicle a transmission shift lever 102, a shifter arm 106, an input ratchet shifting assembly 108, an input shift ratchet and cam assembly 110, a drive shaft 112, a plurality of keys 113, a driven shaft 114, a coupler 115, a driven shaft drive gear 116, a driven shaft driven gear 118, a plurality of rail shifting means 120, a plurality of bushes 121, a plurality of rail shifter support members 122, a plurality of pawl assemblies 124, a plurality of pawl kicker means 126, a lever position control valve assembly 136, an
(Continued)

active detent control valve assembly 138, a detent control valve assembly 140, a clutch selection control valve assembly 142, a gear shift lever position valve lever 144 and a master clutch control valve assembly 100M.

14 Claims, 27 Drawing Sheets

(51) Int. Cl.

| | | |
|---|---|---|
| *F16D 21/06* | (2006.01) | |
| *B60K 20/02* | (2006.01) | |
| *B60K 20/00* | (2006.01) | |
| *B60K 17/02* | (2006.01) | |
| *B60K 23/02* | (2006.01) | |
| *F16D 25/10* | (2006.01) | |
| *F16H 3/00* | (2006.01) | |
| *F16H 59/04* | (2006.01) | |
| *F16H 59/02* | (2006.01) | |

(52) U.S. Cl.
CPC .............. *B60K 23/02* (2013.01); *F16D 21/04* (2013.01); *F16D 21/06* (2013.01); *F16D 25/10* (2013.01); *F16H 3/006* (2013.01); *F16H 59/04* (2013.01); *B60Y 2400/428* (2013.01); *F16D 2021/0661* (2013.01); *F16H 2059/0295* (2013.01)

(58) Field of Classification Search
CPC ........ F16H 3/006; F16H 59/04; F16H 59/042; F16H 63/08; F16H 63/20; F16H 63/30; F16H 63/22; F16H 63/18; F16H 2063/025

See application file for complete search history.

(56) References Cited

U.S. PATENT DOCUMENTS

| | | | |
|---|---|---|---|
| 2007/0137356 A1* | 6/2007 | Itoh ................. | F16H 61/36 74/473.1 |
| 2010/0147097 A1* | 6/2010 | Kim ................. | F16H 63/30 74/473.36 |
| 2014/0090499 A1* | 4/2014 | Fernandez ....... | F16H 59/0208 74/335 |
| 2015/0068342 A1* | 3/2015 | Enami .............. | F16H 61/32 74/473.12 |
| 2015/0075308 A1* | 3/2015 | Enami .............. | F16H 61/28 74/335 |
| 2015/0354682 A1 | 12/2015 | Yamamoto et al. | |
| 2016/0109023 A1* | 4/2016 | Lee .................. | F16H 63/20 74/473.37 |

* cited by examiner

TRANSMISSION CONTROL MECHANISM IN A MANUAL DUAL CLUTCH POWER TRANSMISSION UNIT OF A VEHICLE

CROSS REFERENCE TO RELATED APPLICATIONS

This present application is a national stage filing under 35 U.S.C § 371 of PCT application number PCT/IN2017/5 050371 filed on Aug. 31, 2017 which is based upon and claims the benefit of priority to Indian Patent Application No. 201641029834 filed on Aug. 31, 2016 respectively in the Indian Intellectual Property Office. The disclosures of the above-listed applications are hereby incorporated by reference herein in their entirety.

TECHNICAL FIELD

The embodiments herein generally relate to transmission in vehicles and more particularly, to a hydro-mechanical transmission control mechanism in a manual dual clutch power transmission unit of a vehicle (tractor, constructional vehicle and the like), which controls shifting and selection of gears (odd gear and/or even gear) and corresponding clutches (odd clutch and/or even clutch) respectively.

BACKGROUND

Generally, a power transmission system of a vehicle is used for transmitting power from an engine or an electric motor to the wheels of the vehicle for propelling the vehicle. A conventional dual clutch power transmission system in a vehicle includes a dual clutch unit, a first input shaft coupled to an odd clutch unit of the dual clutch unit, a second input shaft coupled to an even clutch unit of the dual clutch unit, an output shaft, a plurality of odd drive gears (first drive gear, third drive gear and fifth drive gear) are adapted to be rotatably mounted/connected to the first input shaft at corresponding predetermined positions, a plurality of even drive gears (second drive gear, fourth drive gear and sixth drive gear) are adapted to be rotatably mounted/connected to the second input shaft at corresponding predetermined positions, a plurality of odd driven gears (first driven gear, third driven gear and fifth driven gear) are adapted to be rotatably mounted/connected to the output shaft at corresponding predetermined positions, a plurality of even driven gears (second driven gear, fourth driven gear and sixth driven gear) are adapted to be mounted onto the output shaft at corresponding predetermined positions, an electro-hydraulic control valve block and may include other standard components as present in a standard power transmission system. The first input shaft is co-axial to the second input shaft. The second input shaft is a hollow shaft thereby enabling the first input shaft to be provide inside the second input shaft. The first input shaft and the second input shaft is parallel to the output shaft. The electro-hydraulic control valve block control the dual clutch unit. The elector-hydraulic control valve block is efficient in controlling the dual clutch unit. However, the elector-hydraulic control valve block is subjected (prone) to errors due to malfunctioning of some electrical and/or electronic components/devices.

Conventional power transmissions units include a counter shaft transmission, a power shift transmission (planetary gear train transmission) and a continuously variable transmission (CVT)/Infinitely variable transmission (IVT). In counter shaft transmissions forward reverse synchronizers are replaced by the multi-plate friction clutches. Typically, the multi-plate clutches are arranged on the main shaft or on the counter shaft. The forward reverse section of the gear box is generally located in the forward section as close to the engine as possible as a result the forward reverse control element is not subjected to the high relative torque. However, the challenge involved in providing this feature in the existing transmissions is the complex shaft arrangement. This problem arises due to the limitation of center distance between the two shafts and fixed axial dimensions due to the vehicle size limitations. Powershift transmission (planetary gear train transmission) and a continuously variable transmission (CVT)/Infinitely variable transmission (IVT) uses epicyclic gear train unit (planetary gear train) for enabling automatic transmission without the need for manual intervention. The usage of the epicyclic gear train unit (planetary gear train) for providing forward or reverse drive functionality to the powershift transmission (gearbox) and the continuously variable transmission (CVT)/Infinitely variable transmission (IVT is complex in design, and is difficult to assemble and service. The ring gear (internal gear) of the epicyclic gear train unit poses difficulties in manufacturing and incurs high manufacturing costs. The usage of internal gears in the epicyclic gear train unit leads to addition of many components in the gearbox which in turn incurs additional cost, and also increases an overall weight of the vehicle.

Therefore, there exists a need for a hydro-mechanical transmission control mechanism in a manual dual clutch power transmission unit of a vehicle, which obviates the aforementioned drawbacks.

OBJECTS

The principal object of an embodiment of this invention is to provide a hydro-mechanical transmission control mechanism in a manual dual clutch power transmission unit of a vehicle (tractor, constructional vehicle and the like), which controls shifting and selection of gears (odd gear and/or even gear) and corresponding clutches (odd clutch and/or even clutch).

These and other objects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments of the invention are illustrated in the accompanying drawings, throughout which like reference letters indicate corresponding parts in the various figures. The embodiments herein will be better understood from the following description with reference to the drawings, in which.

DETAILED DESCRIPTION

Figure 1:
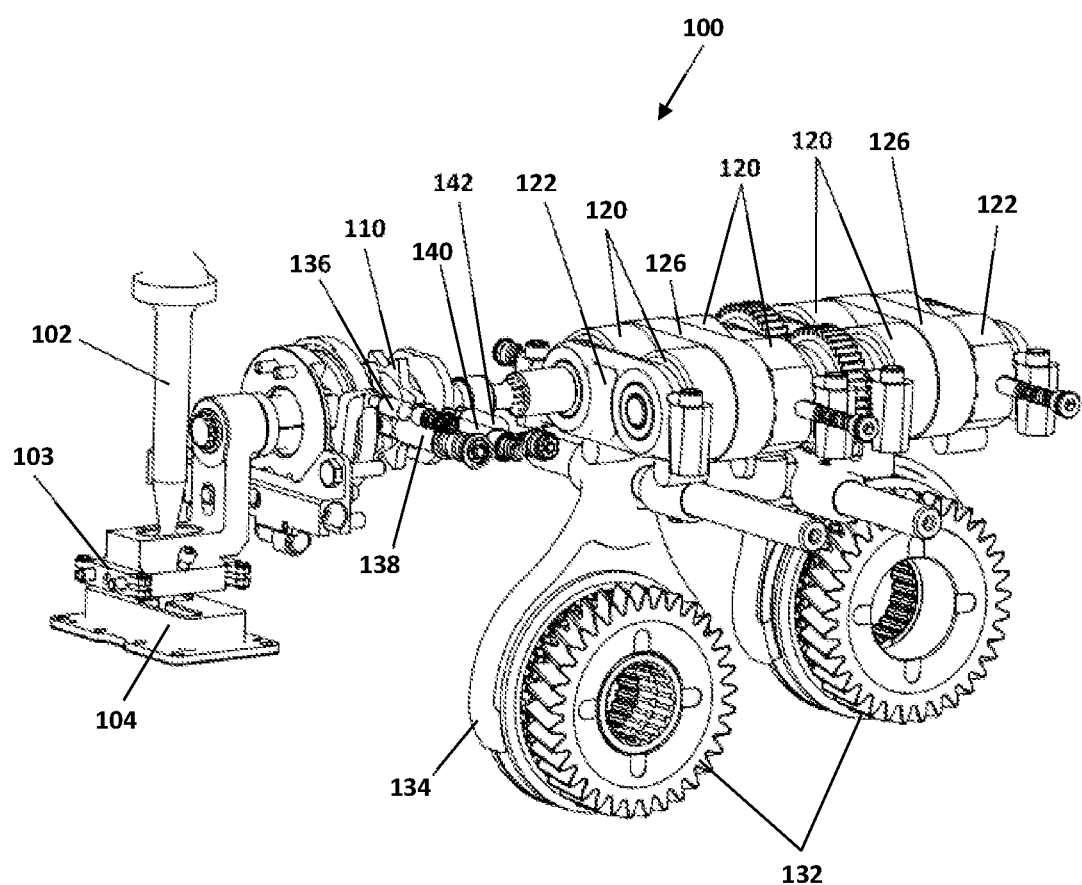
FIG. 1 depicts a perspective view of a transmission control mechanism, according to an embodiment of the invention as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a hydro-mechanical transmission control mechanism in a manual dual clutch power transmission unit of a vehicle (tractor, constructional vehicle and the like), which controls shifting and selection of gears (odd gear and/or even gear) and corresponding clutches (odd clutch and/or even clutch). Referring now to the drawings, and more particularly to FIGS. 1 through 23, where similar reference characters denote corresponding features consistently throughout the figures, there are shown embodiments.

Figure 24:
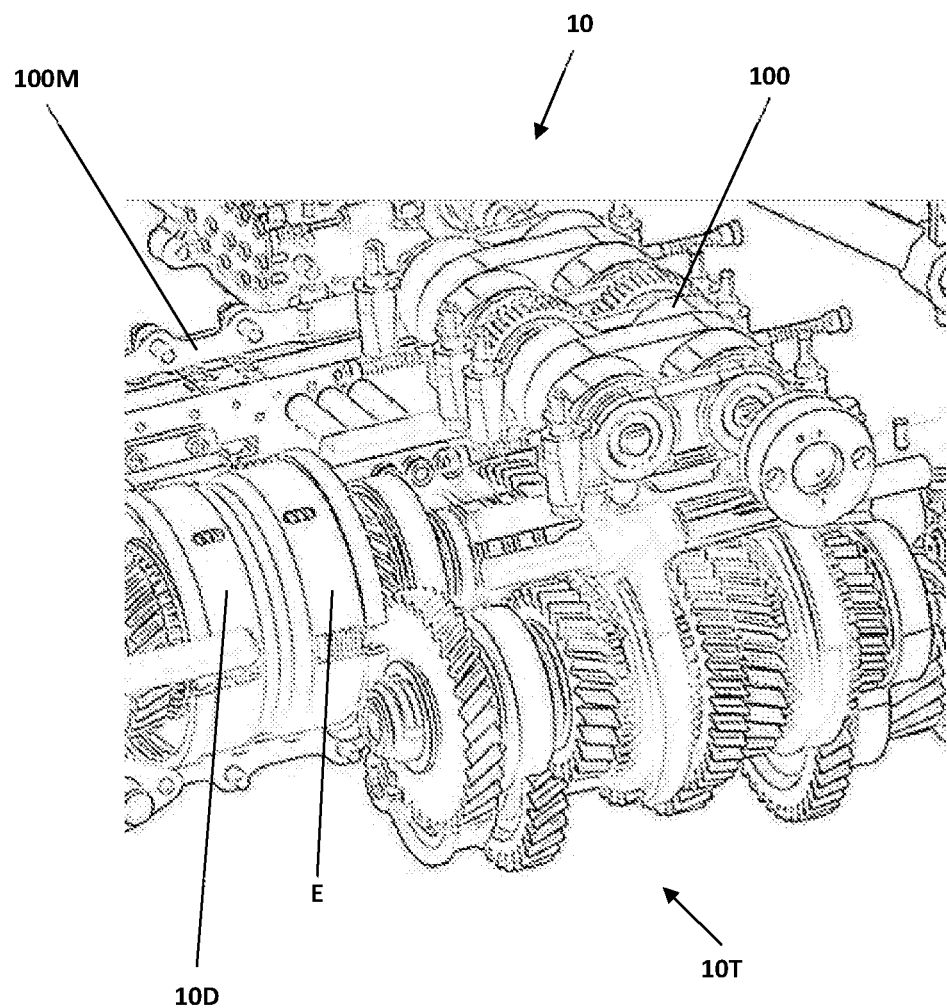
FIG. 24 depicts a multi-speed transmission unit, the transmission control mechanism and a dual clutch unit, where the dual clutch unit includes an even clutch unit, according to an embodiment of the invention as disclosed herein.

FIG. 1 depicts a perspective view of transmission control mechanism 100 in a manual dual clutch power transmission unit 10 of a vehicle, according to an embodiment of the invention as disclosed herein. FIG. 24 depicts a multi-speed transmission unit 10T, the transmission control mechanism 100 and a dual clutch unit 10D, where the dual clutch unit includes an even clutch unit E, according to an embodiment of the invention as disclosed herein. The manual dual clutch power transmission unit 10 includes a multi-speed transmission unit 10T, a dual clutch unit 10D, a transmission control mechanism 100 and may include other standard components/mechanisms/systems as present in a standard transmission unit. In the multi-speed transmission unit 10T, the first drive gear (first speed drive gear which is mounted indirectly onto the odd shaft) is always in engaged position during initial assembly i.e., neutral gear position is not present in the multi-speed transmission unit 10T of the power transmission unit 10. The dual clutch unit 10D is controlled by transmission control mechanism 100 (i.e., a separate clutch pedal is not required for controlling the dual clutch unit 10D). In an embodiment, the transmission control mechanism 100 is a hydro-mechanical transmission control mechanism. In an embodiment, the transmission control mechanism 100 includes a transmission shift lever 102, a gear shift lever support arrangement 103, a shift gate element 104, a gear shift lever auto-return mechanism 105, a shifter arm 106, an input ratchet shifting assembly 108, an input shift ratchet and cam assembly 110, a drive shaft 112, a plurality of keys 113, a driven shaft 114, a coupler 115, a driven shaft drive gear 116, a driven shaft driven gear 118, a plurality of rail shifting means 120, a plurality of bushes 121, a plurality of rail shifter support members 122, a plurality of pawl assemblies 124, a plurality of pawl kicker means 126, a plurality of shift rails 128, a plurality of shift rail-ends 130, a plurality of synchronizers units 132, a plurality of shift forks 134, a lever position control valve assembly 136, an active detent control valve assembly 138, a detent control valve assembly 140, a clutch selection control valve assembly 142, a lever position valve lever 144 and a master clutch control valve assembly 100M. For the purpose of this description and ease of understanding, the transmission control mechanism 100 (hydro-mechanical transmission control mechanism) in the manual dual clutch power transmission unit 10 is explained herein below with reference to be provided in a tractor. However, it is also within the scope of the invention to implement/practice the transmission control mechanism 100 (hydro-mechanical transmission control mechanism) and the components of the power transmission unit 10 in a constructional vehicle, a heavy duty vehicle, an off-road vehicle and/or any other type of vehicle without otherwise deterring the intended function of the transmission control mechanism 100 (hydro-mechanical transmission control mechanism) in the manual dual clutch power transmission unit 10 as can be deduced from the description and corresponding drawings.

In an embodiment, the transmission shift lever 102 is a mono-stable gear shift lever 102. The transmission shift lever 102 (gear shift lever) is operated by the operator (driver driving the vehicle) for controlling the shifting and selection of gears (even gear and/or odd gear) and corresponding clutches (odd clutch and/or even clutch) respectively which are required for various driving conditions of the vehicle. The transmission shift lever 102 (gear shift lever) is indirectly connected to the shifter arm 106 i.e., the transmission shift lever 102 (gear shift lever) is connected to the shifter arm 106 through the gear shift lever support arrangement 103. The transmission shift lever 102 is up shifted to preselect corresponding gear i.e., the transmission shift lever 102 is engaged by the operator to move the transmission shift lever 102 from a shift lever initial position towards a predefined direction (upward direction) for up shifting gears. The transmission shift lever 102 is down-shifted to deselect corresponding gear thereby actuating corresponding previous gear i.e., the transmission shift lever 102 is engaged by the operator to move the transmission shift lever 102 from the shift lever initial position towards the predefined direction (downward direction) for down-shifting gears. When the operator is pushing the transmission shift lever 102 (gear shift lever) away from his sitting position is called up shifting. Now, when the operator is pulling the transmission shift lever 102 (gear shift lever) towards his driver seating is termed as down shifting. The transmission shift lever 102 is provided with a Z-gate sequential gear shift pattern.

Figure 2:
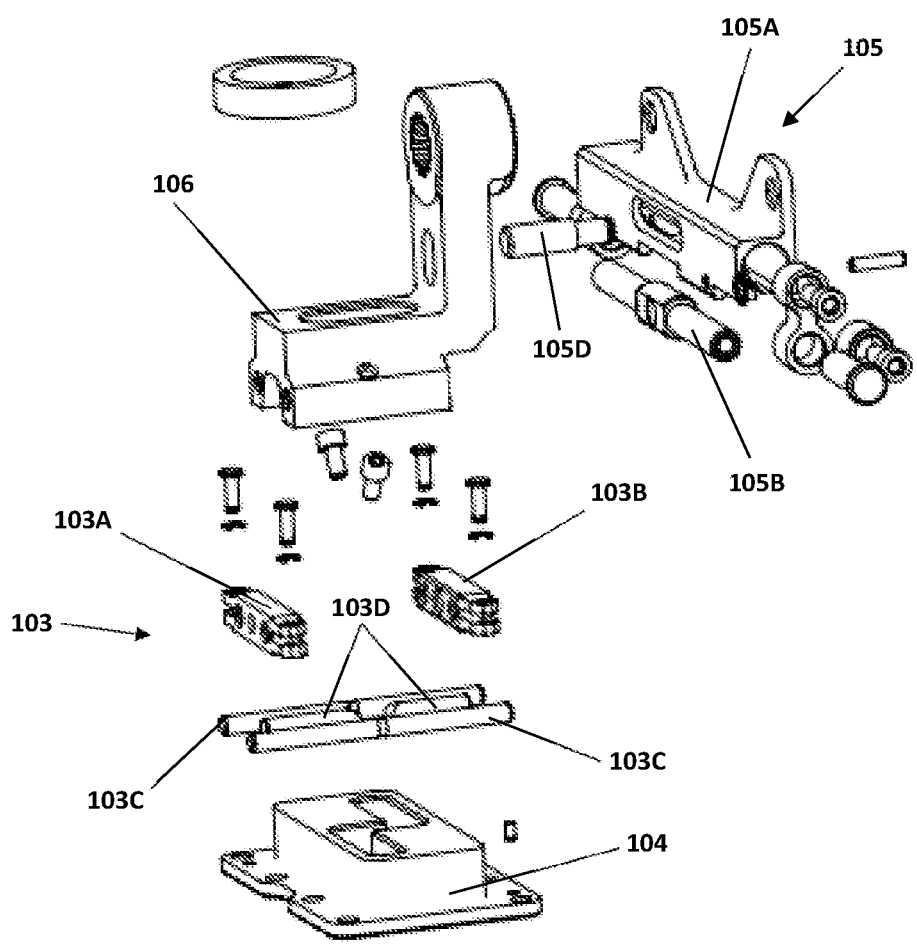
FIG. 2 depicts a perspective view of a portion of the transmission control mechanism, according to an embodiment of the invention as disclosed herein.

FIG. 2 depicts a perspective view of a portion of the transmission control mechanism (100), according to an embodiment of the invention as disclosed herein. The gear shift lever support arrangement 103 is used for supporting the transmission shift lever 102 (gear shift lever). The gear shift lever support arrangement 103 includes a first support means 103A, a second support means 103B, a plurality of locking pins 103C, a plurality of center locking pins 103D and a plurality of fasteners.

Figure 5:
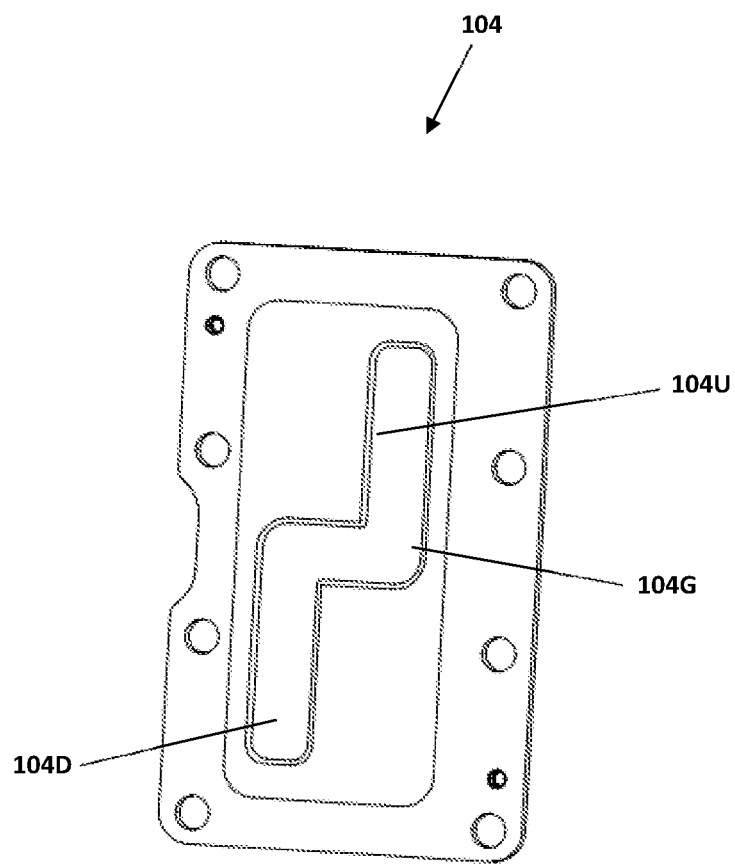
FIG. 5 depicts a perspective view of a shift gate element of the transmission control mechanism, according to an embodiment of the invention as disclosed herein.

FIG. 5 depicts a perspective view of a shift gate element (104) of the transmission control mechanism (100), according to an embodiment of the invention as disclosed herein. The shift gate element 104 includes a shift gate 104G. The shift gate 104G of the shift gate element 104 defines an up shift gate 104U and a downshift gate 104D. The up shift gate 104U of the shift gate 104G is adapted to facilitate (enable) up shift movement of the transmission shift lever 102. The downshift gate 104D of the shift gate 104G is adapted to facilitate (enable) downshift movement of the transmission shift lever 102 (gear shift lever). The upshift gate 104U and the downshift gate 104D of the shift gate 104G define a shift lever initial position in between each other. The shift gate 104G of the shift gate element 104 substantially defines a Z-gate shift pattern (Z-gate sequential gear shift pattern).

Figure 3:
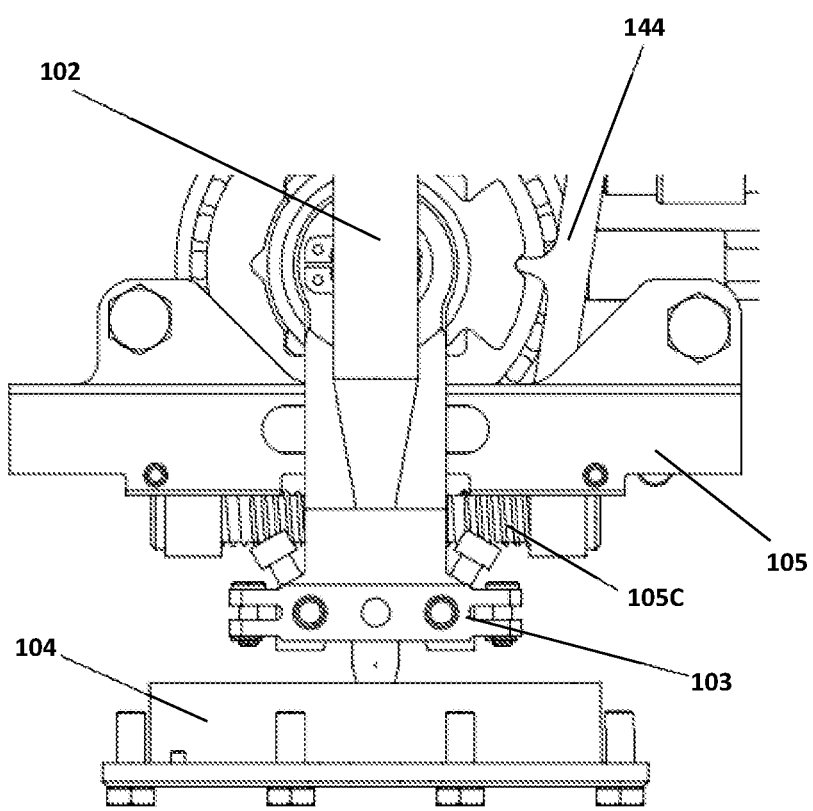
FIG. 3 depicts a perspective view of another portion of the transmission control mechanism, according to an embodiment of the invention as disclosed herein.

FIG. 3 depicts a perspective view of another portion of the transmission control mechanism (100), according to an embodiment of the invention as disclosed herein. The gear shift lever auto-return mechanism 105 is used to move (return) the transmission shift lever 102 (gear shift lever) automatically to its initial position (original position) on dis-engagement of the transmission shift lever 102 (gear shift lever) during up shifting and down shifting to corresponding gear. The gear shift lever auto-return mechanism 105 includes a housing 105A, a movable member 105B (can be considered as piston), a spring 105C, a rod 105D.

Figure 4:
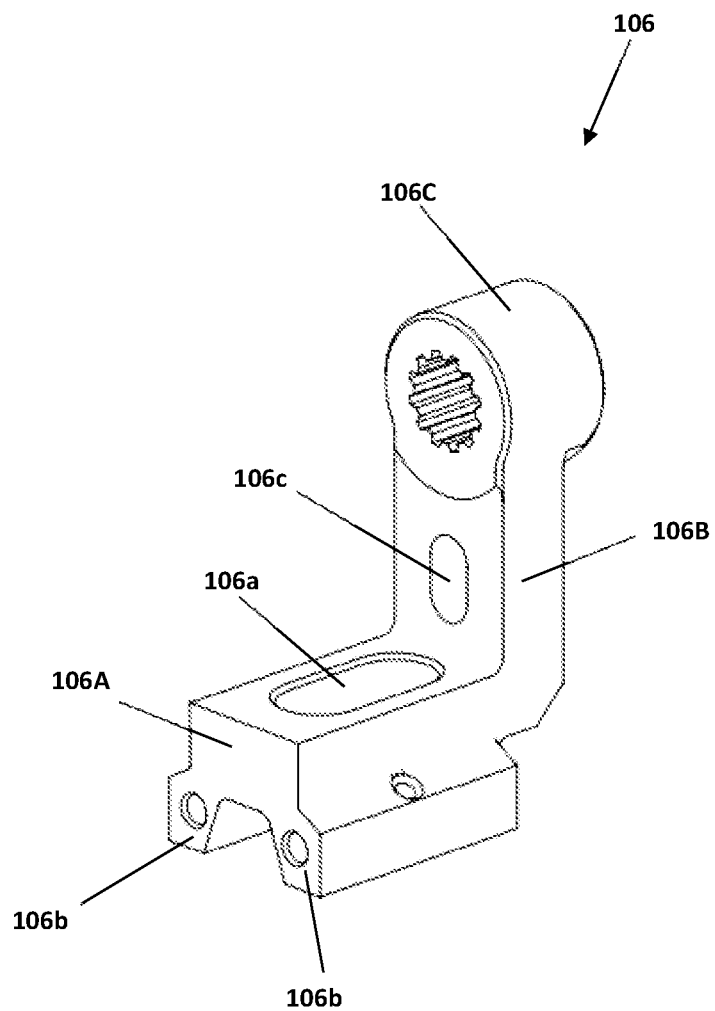
FIG. 4 depicts a perspective view of a shifter arm of the transmission control mechanism, according to an embodiment of the invention as disclosed herein.

FIG. 4 depicts a perspective view of a shifter arm (106) of the transmission control mechanism (100), according to an embodiment of the invention as disclosed herein. The shifter arm 106 is used to move in a predefined direction (clockwise direction or anti-clockwise direction) therein to move the input ratchet shifting assembly 108 on movement of the transmission shift lever 102 (gear shift lever) towards a predefined direction (can be considered as up shift or downshift movement of the transmission shift lever 102). The shifter arm 106 is movably connected to the transmission shift lever 102 (gear shift lever) through the gear shift lever support arrangement 103. The shifter arm 106 is adapted to connect the transmission shift lever 102 (gear shift lever) to the input ratchet shifting assembly 108 thereby transferring the movement of the transmission shift lever 102 to the input ratchet shifting assembly 108. The shifter arm 106 includes a base 106A, a first portion 106B and a second portion 106C. The base 106A of the shifter arm 106 defines a lever receiving portion 106a and a plurality of legs 106b. The lever receiving portion 106a of the base 106A of the shifter arm 106 is adapted to receive corresponding portion of the transmission shift lever 102 (gear shift lever). The plurality of legs 106b of the base 106A is adapted to extend from the base 106A in a downward direction along the lengthwise direction of the base 106A and spaced away from each other, where one leg 106b is parallel to the other leg 106b of the base 106A of the shifter arm 106. The first portion 106F of the shifter arm 106 is transversely extending from the base 106A of the shifter arm 106. The first portion 106B of the shifter arm 106 defines a rod receiving portion 106c adapted to receive corresponding portion of the rod 105D of the gear shift lever auto-return mechanism 105. The second portion 106C of the shifter arm 106C is disposed above the first portion 106B of the shifter arm 106. The second portion 106C of the shifter arm 106 defines a plurality of internal teeth (internal splines) adapted to provide rotatable connection for the input ratchet shifting assembly 108.

Figure 6:
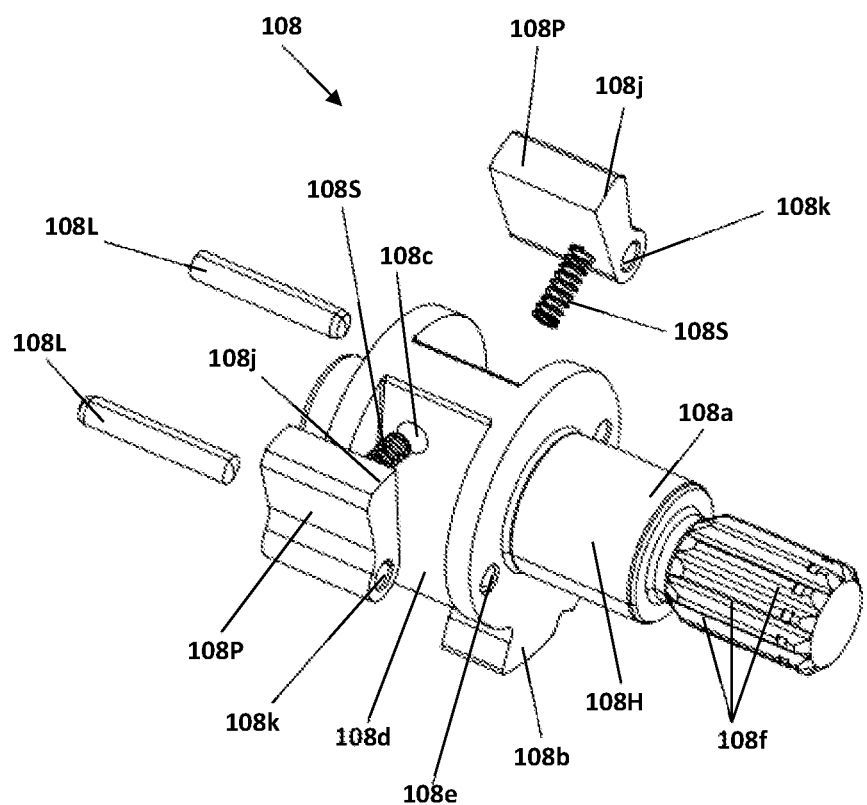
FIG. 6 depicts a perspective view of a input ratchet shifting assembly the transmission control mechanism, according to an embodiment of the invention as disclosed herein.
Figure 7:
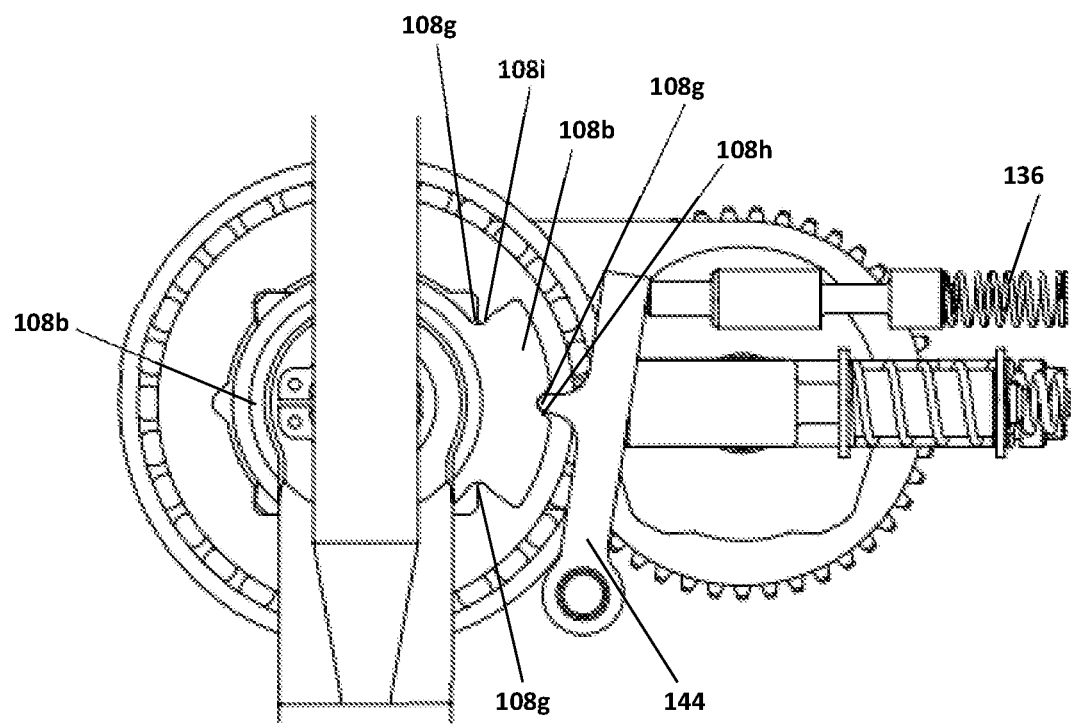
FIG. 7 depicts a perspective view of another portion of the transmission control mechanism, according to an embodiment of the invention as disclosed herein.

FIG. 6 depicts a perspective view of a input ratchet shifting assembly (108) the transmission control mechanism (100), according to an embodiment of the invention as disclosed herein. FIG. 7 depicts a perspective view of another portion of the transmission control mechanism (100), according to an embodiment of the invention as disclosed herein. The input ratchet shifting assembly 108 is used to move/shift the input shift ratchet and cam assembly 110 in response to the movement of the shifter arm 106 along a predefined direction which occurs due to the movement of the transmission shift lever 102 (gear shift lever) towards a predefined direction (can be considered as up shift or downshift movement of the transmission shift lever 102). In an embodiment, the input ratchet shifting assembly 108 includes a pawl housing 108H, a plurality of pawls 108P, a plurality of resilient means 108S and a plurality of pawl locking elements 108L. In an embodiment, the pawl housing 108H defines a shaft 108a, a gear shift lever position cam 108b, a plurality of resilient member receiving portions 108c, a plurality of pawl receiving portions 108d and a plurality of pawl locking member receiving portions 108e. The shaft 108a of the pawl housing 108H is adapted to extend in a direction towards the second portion 106C of the shifter arm 106. The shaft 108a of the pawl housing 108H of the input ratchet shifting assembly 108 is movably (rotatably/turnably) connected to the second portion 106C of the shifter arm 106. The shaft 108a of the pawl housing 106H defines a plurality of external teeth 108f (external splines) provided at a predetermined position (can be considered as one end of the shaft 106s of the pawl housing 102 which is adjacent to the shifter arm 106). The plurality of external teeth 108f (external splines) of the shaft 106s of the pawl housing 108H is adapted to engage corresponding plurality of internal teeth (internal teeth) of the second portion 106C of the shifter arm 106 thereby movably (rotatably/turnably) connecting the input ratchet shifting assembly 108 to the shifter arm 106. The gear shift lever position cam 108b of the pawl housing 108H defines a plurality of gear position portions 108g (can be considered as gear position detent). The plurality of gear position portions of the gear shift lever position cam 108b include an odd gear position portion 108h (odd gear position detent) and an even gear position portion 108i (even gear position detent). Each gear position portion of the gear shift lever position cam 108b of the pawl housing 108H can be considered to be a detent or an undercut. Each resilient member receiving portion 108c of the pawl housing 108H is adapted to receive a portion of corresponding resilient means 108S. Each resilient member receiving portion 108c of the pawl housing 108H can be considered to be a cavity. Each pawl receiving portions 108d of the pawl housing 108H is adapted to receive corresponding pawl 108P. Each pawl locking member receiving portion 108e of the pawl housing 108H is adapted to receive corresponding pawl locking element 108L therein to engage corresponding pawl 108P with pawl housing 108H at a predetermined position. Each pawl locking member receiving portion 108e of the pawl housing 108H can be considered to be a hole (opening). Each pawl 108P of the input ratchet shifting assembly 108 is received by corresponding pawl receiving portion 108d of the pawl housing 108H. Each pawl 108P is loaded (spring loaded) to the pawl housing 108H. Each pawl 108P defines a locking portion 108j and a locking member receiving portion 108k. The locking member receiving portion 108k of each pawl 108P is adapted to receive corresponding pawl locking element 108L therein to connect each pawl 108P to the pawl housing 108H. The locking member receiving portion 108k of each pawl 108P can be considered to be a hole (opening). At least a portion of each resilient means 108S of the input ratchet shifting assembly 108 is received by corresponding resilient member receiving portions 108c of the pawl housing 108H. A portion of at least one resilient means 108S of the input ratchet shifting assembly 108 is disposed external to corresponding resilient member receiving portion 108c of the pawl housing 108H when corresponding gear (odd or even gear) is in engaged position. Each pawl locking elements 108L of the input ratchet shifting assembly 108 is adapted to be received by corresponding pawl locking member receiving portion 108e the pawl housing 108H there through to enable each pawl locking element 108L to be received by corresponding locking member receiving portion 108k of corresponding pawl 108P thereby facilitating engagement of corresponding pawl 108P with the pawl housing 108H of the input ratchet shifting assembly 108. Each pawl locking elements 108L of the input ratchet shifting assembly 108 can be considered to be a locking pin. It is also within the scope of the invention to provide the input ratchet shifting assembly 108 with any other type of locking means to enable engagement of each pawl 108P with the pawl housing 108H of the input ratchet shifting assembly 108.

Figure 8:
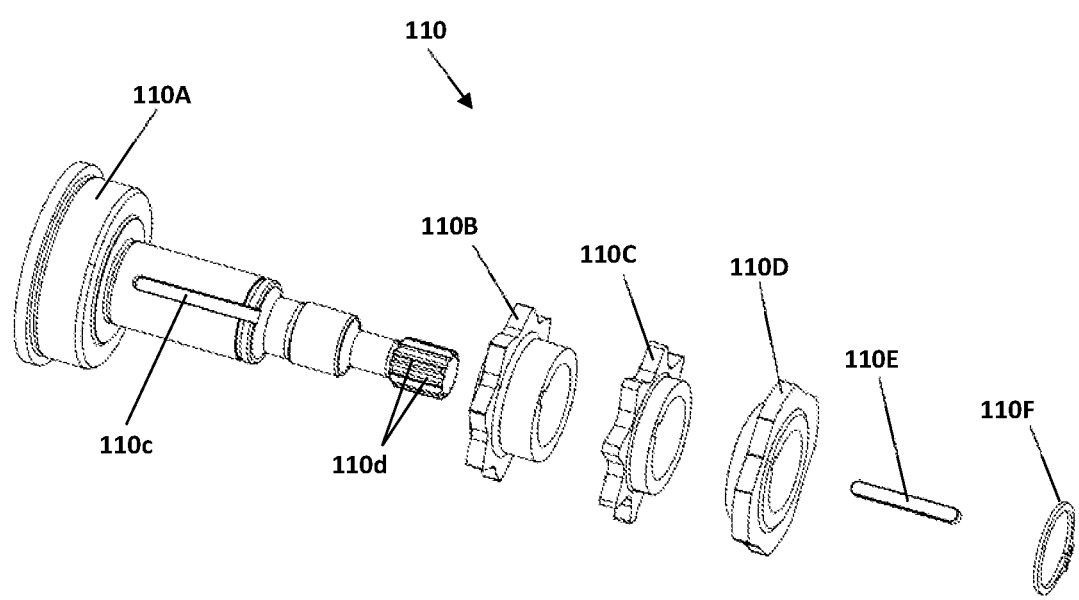
FIG. 8 depicts an exploded view of an input shift ratchet and cam assembly of the transmission control mechanism, according to an embodiment of the invention as disclosed herein.
Figure 9:
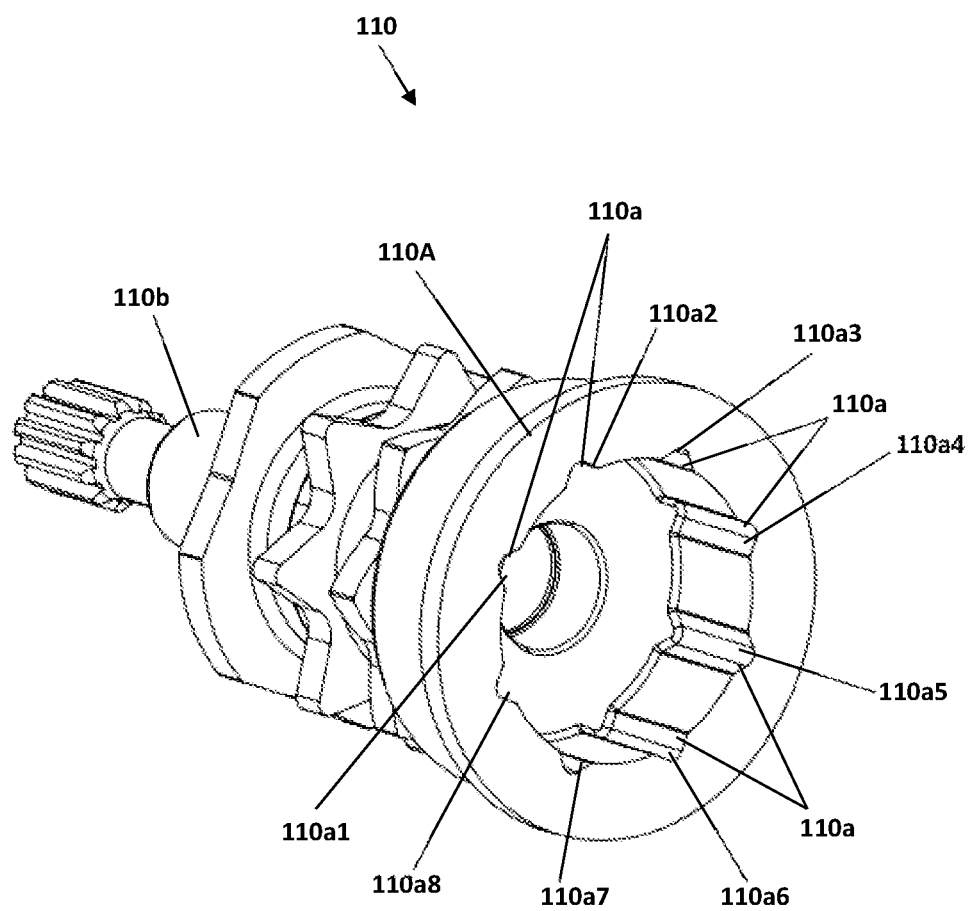
FIG. 9 depicts a perspective view of an input shift ratchet and cam assembly of the transmission control mechanism, according to an embodiment of the invention as disclosed herein.
Figure 10:
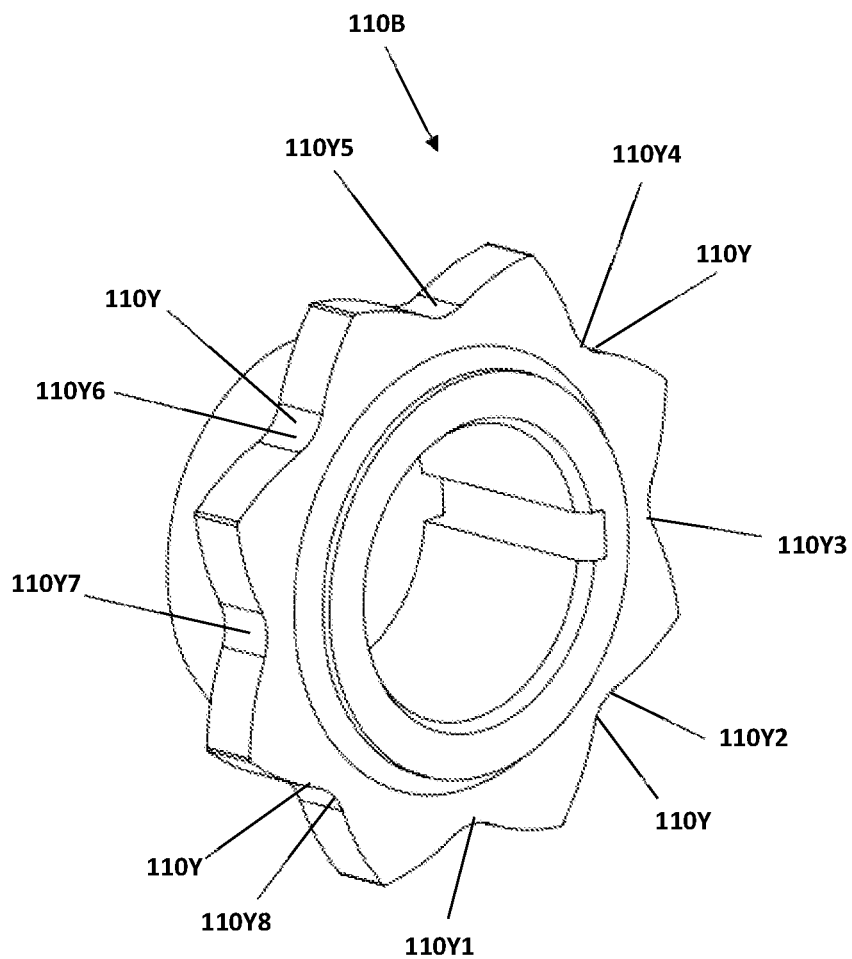
FIG. 10 depicts a perspective view of an active detent cam input shift ratchet and cam assembly of the transmission control mechanism, according to an embodiment of the invention as disclosed herein.
Figure 11:
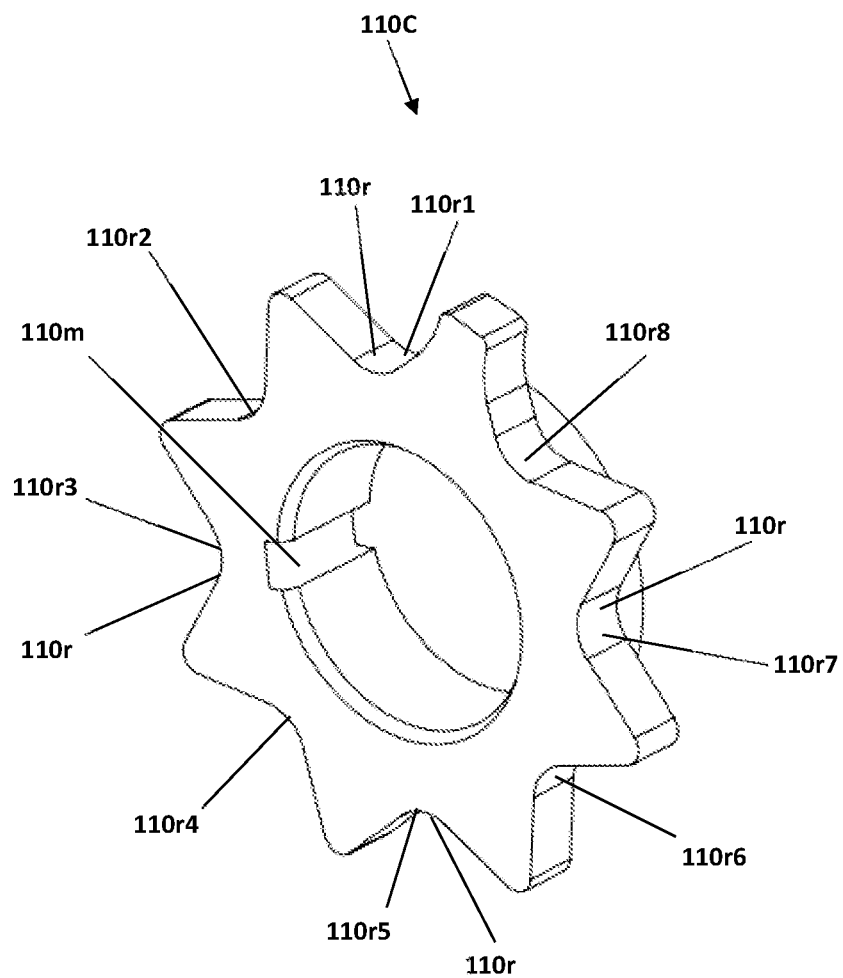
FIG. 11 depicts a perspective view of a rotary detent cam of the input shift ratchet and cam assembly, according to an embodiment of the invention as disclosed herein.
Figure 12:
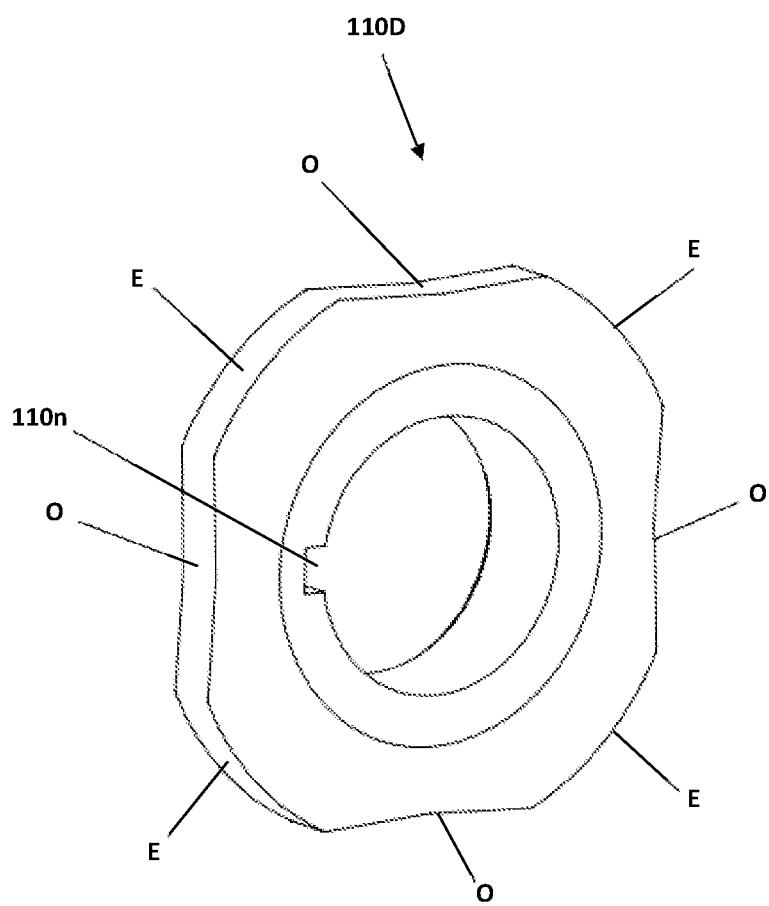
FIG. 12 depicts a perspective view of a clutch selection cam of the input shift ratchet and cam assembly, according to an embodiment of the invention as disclosed herein.

FIG. 8 depicts an exploded view of an input shift ratchet and cam assembly (110) of the transmission control mechanism (100), according to an embodiment of the invention as disclosed herein. FIG. 9 depicts a perspective view of an input shift ratchet and cam assembly (110) of the transmission control mechanism (100), according to an embodiment of the invention as disclosed herein. In an embodiment, the input shift ratchet and cam assembly 110 includes a shift ratchet 110A, an active detent cam 110B, a rotary detent cam 110C, a clutch selection cam 110D, a key 110E and a circlip 110F. In an embodiment, the shift ratchet 110A of the input shift ratchet and cam assembly 110 defines a plurality of pawl locking portions 110a and a shaft 110b. Each pawl locking portion 110a of the shift ratchet 110A is adapted to be engaged by the locking portion 108j of at least one pawl 108P of the input ratchet shifting assembly 108 therein to move (rotate/turn) the shift ratchet 110A which in turn moves (rotates/turns) at least one of the active detent cam 110B, the rotary detent cam 110C, the clutch selection cam 110D and the drive shaft 112 in response to the movement (rotation/turning) of the input ratchet shifting assembly 108 at the predefined angle due to movement (rotation/turning) of the shifter arm on engagement of the transmission shift lever 102 adapted to be upshifted or downshifted to select corresponding gear. The plurality of pawl locking portions 110a of the shift ratchet 110A includes a first gear position pawl locking portion 110a1, a second gear position pawl locking portion 110a2, third gear position pawl locking portion 110a3, a fourth gear position pawl locking portion 110a4, a fifth gear position pawl locking portion 110a5, a sixth gear position pawl locking portion 110a6, a seventh gear position pawl locking portion 110a7 and an eighth gear position pawl locking portion 110a8. In an embodiment, the plurality of pawl locking portions 110a can be considered to be a plurality of internal teeth (splines). The shaft 110b of the shift ratchet 110A is adapted to extend in a direction towards the drive shaft 112. The shaft 110b of the shift ratchet 110A defines a key seating portion 110c and a plurality of external teeth 110d (external splines), which are provided at corresponding predetermined positions. The key seating portion 110c of the shaft 110b of the shift ratchet 110A is adapted to extending along the lengthwise direction of the shaft 110b between the active detent cam 110B and the clutch selection cam 110D. The key seating portion 110c of the shaft 110b of the shift ratchet 110A is adapted to receive a portion of the key 110E therein to facilitate mounting of the active detent cam 110B, the rotary detent cam 110C and the clutch selection cam 110D. The shaft 110b of the shift ratchet 110A is rotatably connected to the drive shaft 112 through the coupler 115. The plurality of external teeth 110d of the shaft 110b of the shift ratchet 110A is provided at a predetermined position (can be considered as the end of the shaft 110b of the shift ratchet 110A which is adjacent to the coupler 115). The plurality of external teeth 110d of the shaft 110b of the shift ratchet 110A is adapted to engage corresponding plurality of internal teeth 115I (internal splines) of the coupler 115 therein to drive the drive shaft 112 on movement of the shift ratchet 110A during up shifting or downshifting to select corresponding gear. The active detent cam 110B is key fitted to the shaft 110b of the shift ratchet 110A at a predetermined position. FIG. 10 depicts a perspective view of an active detent cam (110B) of the input shift ratchet and cam assembly (110) of the transmission control mechanism (100), according to an embodiment of the invention as disclosed herein. The active detent cam 110B is adapted to be engaged by a cam follower of the active detent control valve assembly 138 therein to move the active detent cam 110B therein to facilitate de-actuation of corresponding gear which occurs after up shifting to preselect corresponding gear. In an embodiment, the active detent cam 110B defines a plurality of gear position portions 110Y (can be considered as gear position detent). The plurality of gear position portions 110Y of active detent cam 110B includes a first gear position portion 110Y1, a second gear position portion 110Y2, a third gear position portion 110Y3, a fourth gear position portion 110Y4, a fifth gear position portion 110Y5, a sixth gear position portion 110Y6, a seventh gear position portion 110Y7 and an eighth gear position portion 110Y8. In an embodiment, the plurality of gear position portions 110Y of the active detent cam 110B can be considered to be a detent or an undercut. The active detent cam 110B defines a keyway 110k adapted to receive corresponding portion of the key E therein to facilitate mounting of the active detent cam 110B onto the shift ratchet 110A at the predetermined position. FIG. 11 depicts a perspective view of a rotary detent cam (110C) of the input shift ratchet and cam assembly (110), according to an embodiment of the invention as disclosed herein. The rotary detent cam 110C is key fitted to the shaft 110b of the shift ratchet 110A at predetermined position. The rotary detent cam 110C is adapted to move a cam follower 140f of the detent control valve assembly 140. In an embodiment, the rotary detent cam 110C defines a plurality of gear position portions 110r (can be considered as gear position detent). The plurality of gear position portions 110r of rotary detent cam 110C includes a first gear position portion 110r1, a second gear position portion 110r2, a third gear position portion 110r3, a fourth gear position portion 110r4, a fifth gear position portion 110r5, a sixth gear position portion 110r6, a seventh gear position portion 110r7 and an eighth gear position portion 110r8. In an embodiment, the plurality of gear position portions 110r of the rotary detent cam 110C can be considered to be a detent or an undercut. The rotary detent cam 110C defines a keyway 110m adapted to receive corresponding another portion of the key E therein to facilitate mounting of the rotary detent cam 110C onto the shift ratchet 110A at the predetermined position. FIG. 12 depicts a perspective view of a clutch selection cam (110D) of the input shift ratchet and cam assembly (110), according to an embodiment of the invention as disclosed herein. The clutch selection cam 110D is key fitted to the shaft 110b of the shift ratchet 110A at a predetermined position. The clutch selection cam 110D is adapted to move a cam follower 142f of the clutch selection control valve assembly 142. In an embodiment, the clutch selection cam 110D defines a plurality of odd gear position peripheral portions O and a plurality of even gear position peripheral portions E. In an embodiment, each odd gear position peripheral portion O of the clutch selection cam 110D substantially defines an arc shape configuration. In an embodiment, each odd gear position peripheral portion O of the clutch selection cam 110D substantially defines an arc shape configuration. The clutch selection cam 110D defines a keyway 110n adapted to receive corresponding another portion of the key E therein to facilitate mounting of the clutch selection cam 110D onto the shift ratchet 110A at the predetermined position. The circlip 110F is used to restrict the axial (linear) movement of the active detent cam 110B, the rotary detent cam 110C and the clutch selection cam 110D.

Figure 13:
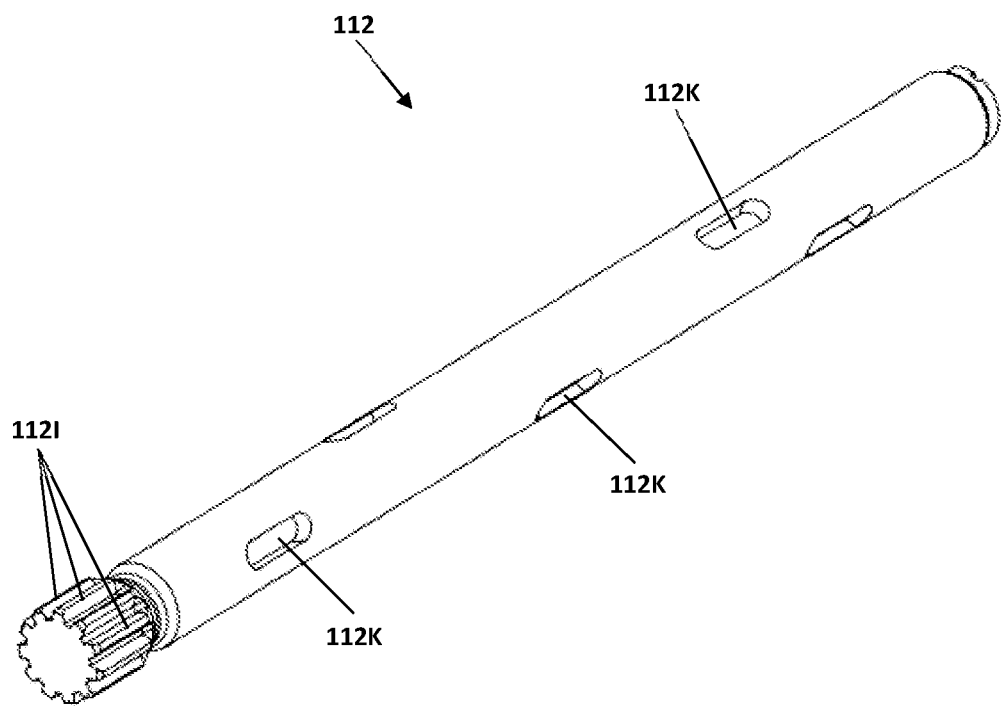
FIG. 13 depicts a perspective view of a drive shaft, according to an embodiment of the invention as disclosed herein.

FIG. 13 depicts a perspective view of a drive shaft (112), according to an embodiment of the invention as disclosed herein. The drive shaft 112 is rotatably connected to the shaft 110b of the shift ratchet 110A of the input shift ratchet and cam assembly 110 through the coupler 115 i.e., the drive shaft 112 is driven by the shaft 110b of the shift ratchet 110A of the input shift ratchet and cam assembly 110 through the coupler 115. The drive shaft 112 defines a plurality of external teeth 112I (internal splines) provided at a predetermined position (can be considered as the end of the drive shaft 112 which is adjacent to the coupler 115. The plurality of external teeth 112I (internal splines) of the drive shaft 112 is adapted to engage corresponding plurality of internal teeth 115I (internal splines) of the coupler 115. The drive shaft 112 defines a plurality of key seating portions 112K provided at corresponding predetermined positions (angles). Each key seating portions 112K of the drive shaft 112 is adapted to receive a portion of corresponding key 113 therein to facilitate rotatable mounting of corresponding pawl assembly 124. The drive shaft 112 is used to drive the driven shaft 114 through the driven shaft drive gear 116 and the driven shaft driven gear 118 i.e., the drive shaft 112 drives the driven shaft drive gear 116 therein to drive the driven shaft 114 through the driven shaft driven gear 118. The drive shaft 112 is adapted to drive at least one corresponding pawl assembly 124 therein to move corresponding rail shifting means 120 to move corresponding shift rail 130 in a predefined direction to enable movement of corresponding shift fork 134 and corresponding synchronizer unit 132 to corresponding gear position in a direction towards corresponding gear thereby facilitating pre-selection of corresponding gear on movement of the shifter arm 106 in a predefined direction and at a predefined angle during up shifting of the transmission shift lever 102 to corresponding gear pre-selection position.

Figure 14:
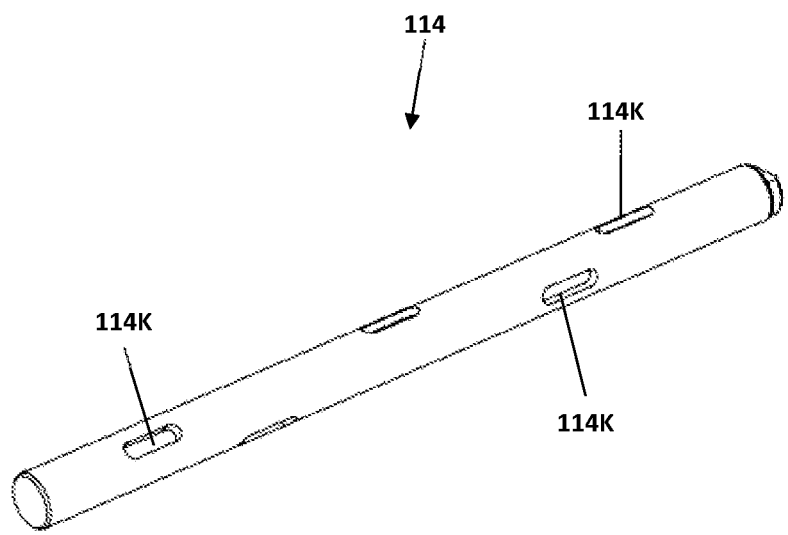
FIG. 14 depicts a perspective view of a driven shaft, according to an embodiment of the invention as disclosed herein.
Figure 15:
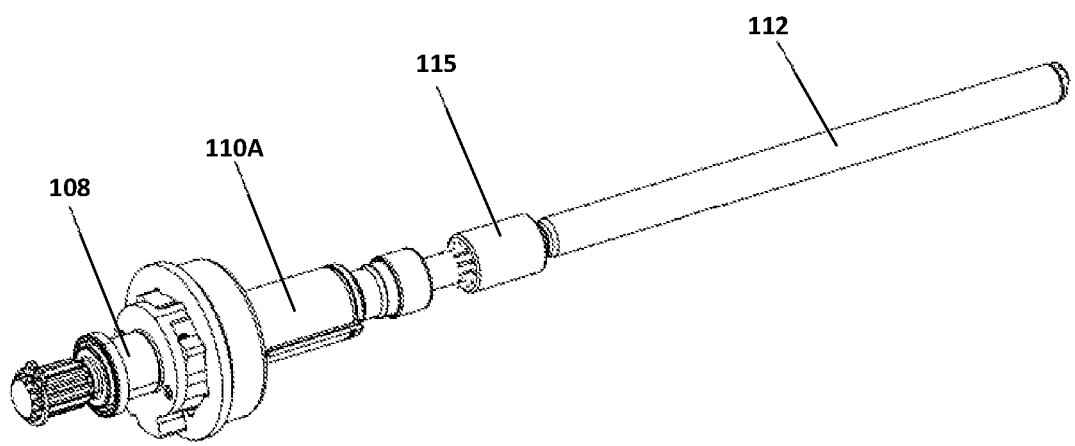
FIG. 15 depicts a perspective view of the input ratchet shifting assembly, the drive shaft and a coupler in assembled condition, according to an embodiment of the invention as disclosed herein.

FIG. 14 depicts a perspective view of a driven shaft (114), according to an embodiment of the invention as disclosed herein. The driven shaft 114 is driven by the drive shaft 112 through the driven shaft driven gear 118 and the driven shaft drive gear 116. The driven shaft 114 is rotatably connected to the drive shaft 112. The driven shaft 114 defines a plurality of key seating portions 114K provided at corresponding predetermined positions (angles). Each key seating portion 114K of the driven shaft 114 is adapted to receive a portion of corresponding key 113 therein to facilitate rotatable mounting of corresponding pawl assembly 124. The driven shaft 114 is adapted to drive at least one corresponding pawl assembly 124 therein to move corresponding rail shifting means 120 to move corresponding shift rail 130 in a predefined direction to enable movement of corresponding shift fork 134 and corresponding synchronizer unit 132 to corresponding gear position in a direction towards corresponding gear thereby facilitating pre-selection of corresponding gear on movement of the shifter arm 106 in a predefined direction and at a predefined angle during upshifting of the transmission shift lever 102 to corresponding gear pre-selection position.

Figure 16:
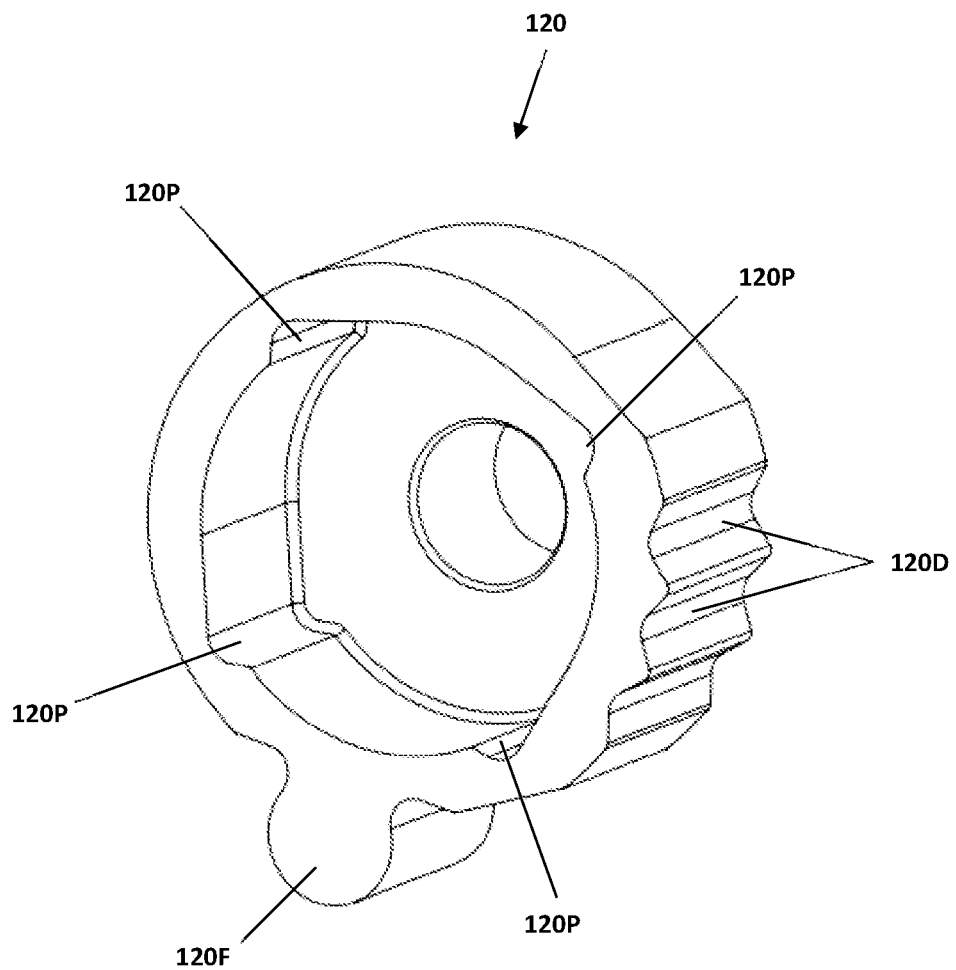
FIG. 16 depicts a perspective view of a rail shifting means, according to an embodiment of the invention as disclosed herein.
Figure 17:
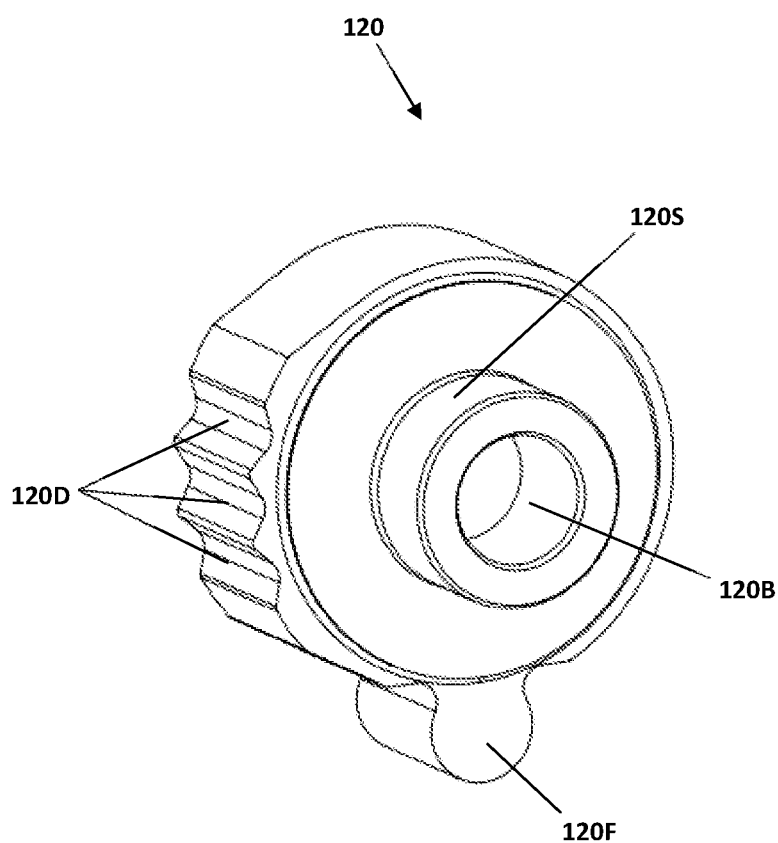
FIG. 17 depicts another perspective view of the rail shifting means, according to an embodiment of the invention as disclosed herein.
Figure 27:
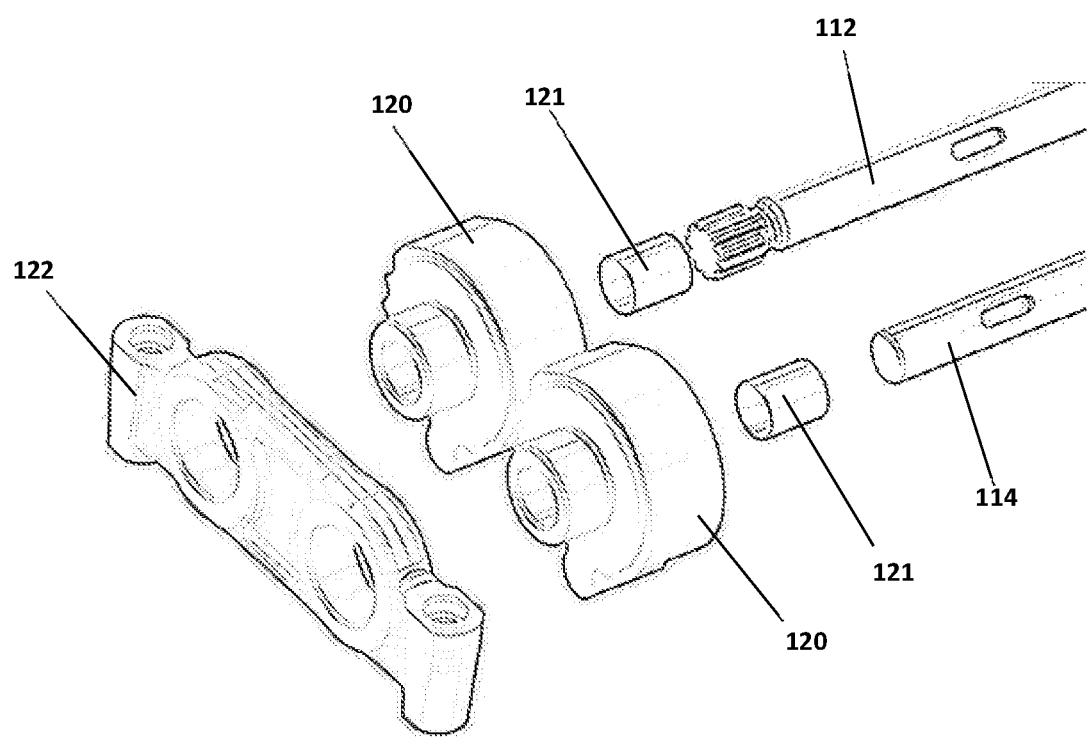
FIG. 27 depicts an exploded view showing rail shifting means, bushes, rail shifter support members, the drive shaft and the driven shaft, according to an embodiment of the invention as disclosed herein.

FIG. 16 depicts a perspective view of a rail shifting means (120), according to an embodiment of the invention as disclosed herein. FIG. 17 depicts another perspective view of the rail shifting means (120), according to an embodiment of the invention as disclosed herein. FIG. 27 depicts an exploded view showing rail shifting means 120, bushes 121, rail shifter support members 122, the drive shaft 112 and the driven shaft 114, according to an embodiment of the invention as disclosed herein. The plurality of rail shifting means 120 is mounted to corresponding drive shaft 112 and driven shaft 114 through corresponding bush 121. Each rail shifting means 120 is freely rotating on corresponding drive shaft 112 and driven shaft 114. In an embodiment, each rail shifting means 120 is shifted (moved) by corresponding pawl assembly 124 therein to enable corresponding rail shifting means 120 to shift (move) corresponding shift rail 130 to in a predefined direction to enable movement of corresponding shift fork 134 and corresponding synchronizer unit 132 to corresponding gear position in a direction towards corresponding gear thereby facilitating pre-selection of corresponding gear on movement of the shifter arm 106 in a predefined direction and at a predefined angle during up shifting of the transmission shift lever 102 to corresponding gear pre-selection position. In an embodiment, each rail shifting means 120 defines a plurality of pawl locking portions 120P, a shift finger 120F, a plurality of detents 120D and a supporting portion 120S. The plurality of pawl locking portions 120P of each rail shifting means 120 are provided to an inner portion of the rail shifting means 120 at corresponding predetermined positions. In an embodiment, the plurality of pawl locking portions 120P of the rail shifting means 120 can be considered to be a plurality of internal teeth. The supporting portion 120S of each rail shifting means 120 defines a bush receiving portion 120B adapted to receive corresponding bush 121 therein to mount corresponding rail shifting means 120 to corresponding drive shaft 112 and driven shaft 114. The shift finger 120F of each rail shifting means 120 is adapted to shift (move) corresponding shift rail 128 in a predefined direction therein to move corresponding shift fork 134 and the synchronizer sleeve 132S of corresponding synchronizer unit 132 in a direction from a neutral position to corresponding gear position in a direction towards corresponding gear thereby enabling engagement of corresponding synchronizer unit with corresponding gear to facilitate actuation of corresponding gear. Each detent 120D of each rail shifting means 120 is adapted to be selectively engaged by corresponding detent engaging element (detent ball or detent pin) therein to restrict the movement of corresponding rail shifting means 120 when corresponding gear is in engaged position (actuated position). In an embodiment, the plurality of rail shifting means 120 include a first gear position rail shifting means 120a, a second gear position rail shifting means 120b, a third gear position rail shifting means 120c, a fourth gear position rail shifting means 120d, a fifth gear position rail shifting means 120e, a sixth gear position rail shifting means 120f, a seventh gear position rail shifting means 120g and an eighth gear position rail shifting means 120h.

Figure 18:
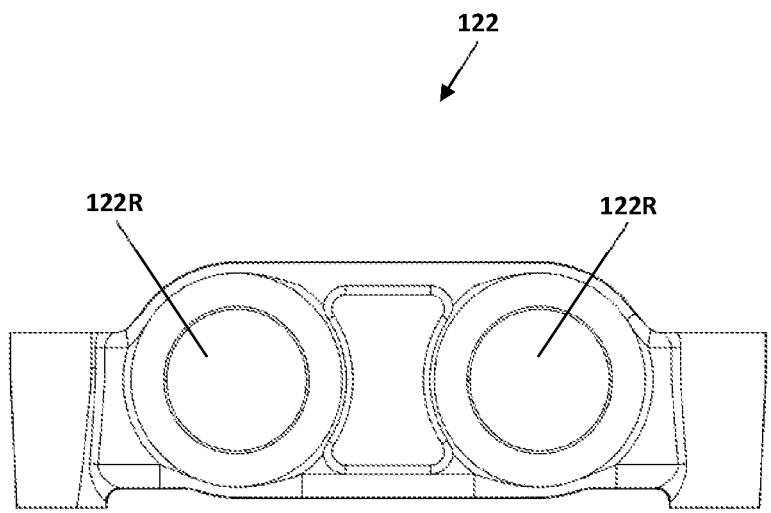
FIG. 18 depicts a front view of a rail shifter support member, according to an embodiment of the invention as disclosed herein.

FIG. 18 depicts a front view of a rail shifter support member (122), according to an embodiment of the invention as disclosed herein. Each rail shifter support member 122 is adapted to support corresponding rail shifting means 120. Each rail shifter support members 122 defines a plurality of rail shifter support receiving portions 122R adapted to receive the support portion 120S of corresponding rail shifting means 120d. Each rail shifter support members 122 is removably connected to a transmission shift cover or transmission housing. The plurality of rail shifter support members 122 includes a first rail shifter support member 122A, a second rail shifter support member 122B, a third rail shifter support member 122C and a fourth rail shifter support member 122D.

Figure 19:
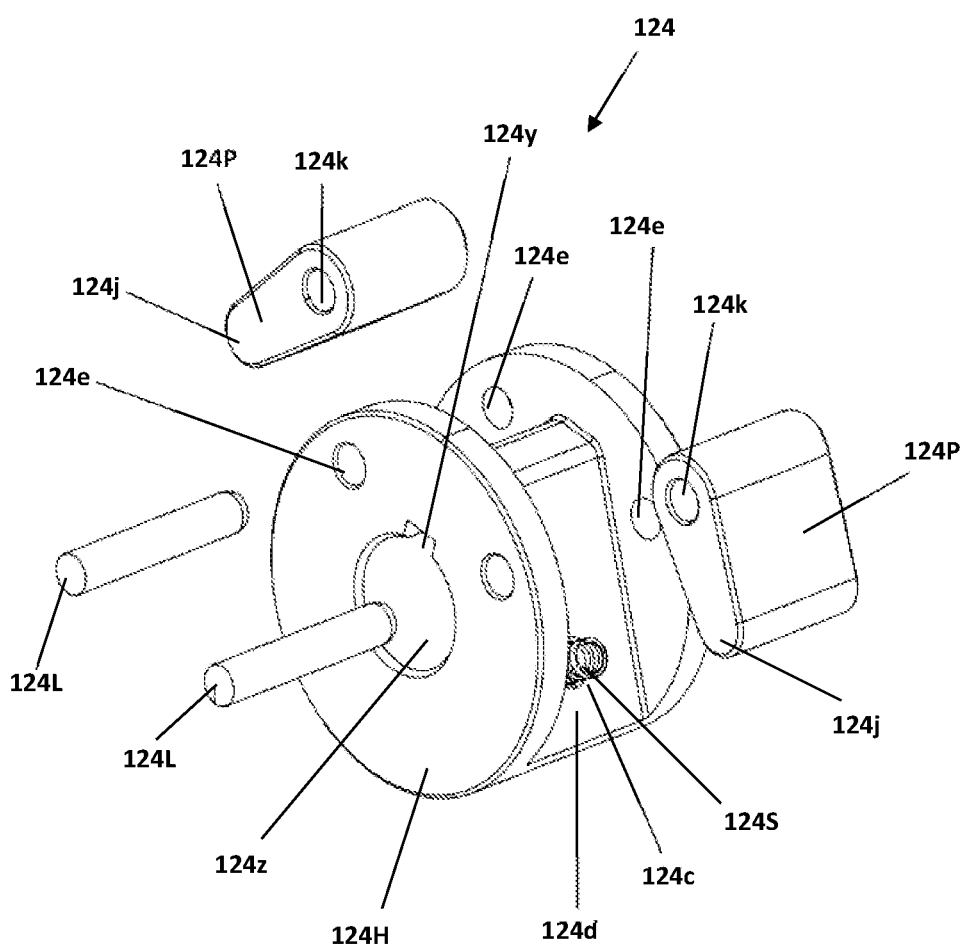
FIG. 19 depicts an exploded view of a pawl assembly, according to an embodiment of the invention as disclosed herein.
Figure 23:
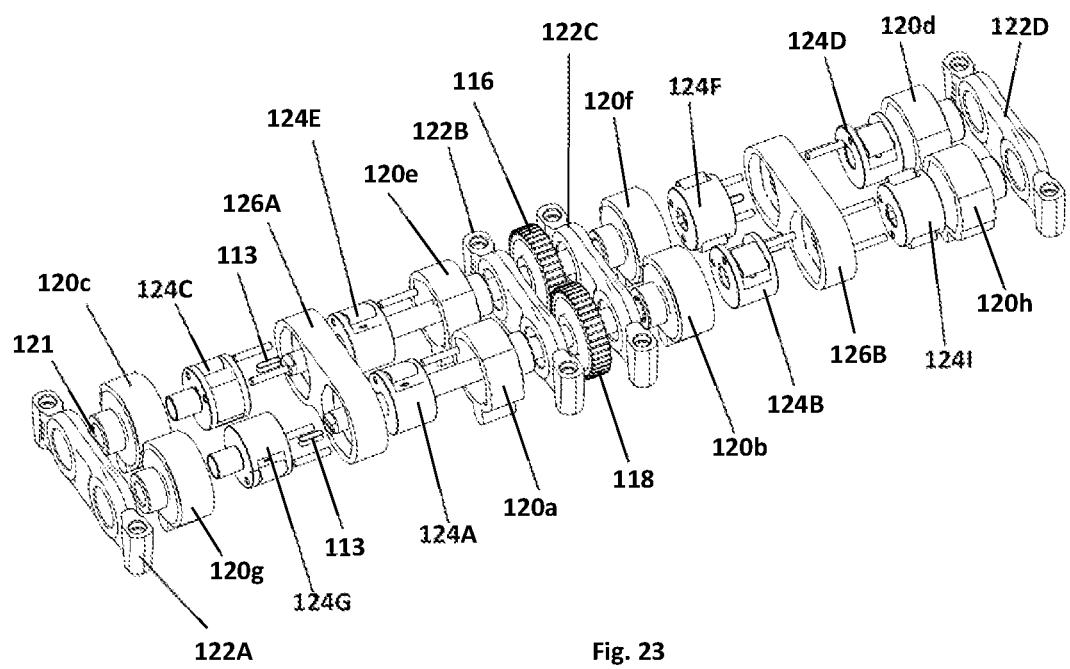
FIG. 23 depicts an exploded view of a plurality of rail shifting means, a plurality of rail shifter support members, a plurality of pawl assemblies and a plurality of pawl kicker means, according to an embodiment of the invention as disclosed herein.

FIG. 19 depicts an exploded view of a pawl assembly (124), according to an embodiment of the invention as disclosed herein. FIG. 23 depicts an exploded view of a plurality of rail shifting means (120), a plurality of rail shifter support members (122), a plurality of pawl assemblies (124) and a plurality of pawl kicker means (126), according to an embodiment of the invention as disclosed herein. Each pawl assembly 124 includes a pawl housing 124H, a plurality of pawls 124P, a plurality of resilient means 124S and a plurality of pawl locking elements 124L. In an embodiment, the pawl housing 124H of each pawl assembly 124 defines a plurality of resilient member receiving portions 124c, a plurality of pawl receiving portions 124d, a plurality of pawl locking member receiving portions 124e and a shaft receiving portion 124z. Each resilient member receiving portion 124c of the pawl housing 124H of each pawl assembly 124 is adapted to receive a portion of corresponding resilient means 124S. Each resilient member receiving portion 124c of the pawl housing 124H of each pawl assembly 124 can be considered to be a cavity. Each pawl receiving portions 124d of the pawl housing 124H of each pawl assembly 124 is adapted to receive corresponding pawl 124P. Each pawl locking member receiving portion 124e of the pawl housing 124H of each pawl assembly 124 is adapted to receive corresponding pawl locking element 124L therein to engage corresponding pawl 124P with pawl housing 124H of corresponding pawl assembly 124 at a predetermined position. Each pawl locking member receiving portion 124e of the pawl housing 124H of each pawl assembly 124 can be considered to be a hole (opening). The shaft receiving portion 124z of the pawl housing 124H of the plurality of pawl assemblies 124 is adapted to receive corresponding portion of corresponding drive shaft 112 and the driven shaft 114. The shaft receiving portion 124z of the pawl housing 124H of the plurality of pawl assemblies 124 defines a keyway 124y adapted to receive corresponding keys 113 thereby rotatably mounting the plurality of pawl assemblies 124 to corresponding drive shaft 112 and driven shaft 114 at corresponding predetermined position. Each pawl 124P of each pawl assembly 124 is received by corresponding pawl receiving portion 124d of the pawl housing 124H of corresponding pawl assembly 124. Each pawl 124P of each pawl assembly 124 is loaded (spring loaded) to the pawl housing 124H of corresponding pawl assembly 124. Each pawl 124P of each pawl assembly 124 defines a locking portion 124j and a locking member receiving portion 124k. The locking member receiving portion 124k of each pawl 124P is adapted to receive corresponding pawl locking element 124L therein to connect each pawl 124P to the pawl housing 124H. The locking member receiving portion 124k of each pawl 124P can be considered to be a hole (opening). At least a portion of each resilient means 124S of each pawl assembly 124 is received by corresponding resilient member receiving portions 124c of the pawl housing 124H. Each pawl locking elements 124L of each pawl assembly 124 is adapted to be received by corresponding pawl locking member receiving portion 124e the pawl housing 124H there through to enable each pawl locking element 124L to be received by corresponding locking member receiving portion 124k of corresponding pawl 124P thereby facilitating engagement of corresponding pawl 124P with the pawl housing 124H of corresponding pawl assembly 124. Each pawl locking elements 124L of pawl assembly 124 can be considered to be a locking pin. It is also within the scope of the invention to provide each pawl assembly 124 with any other type of locking means to enable engagement of each pawl 124P with the pawl housing 124H of corresponding pawl assembly 124. The plurality of pawl assembly 124 includes a first gear position pawl assembly 124A, a second gear position pawl assembly 124B, a third gear position pawl assembly 124C, a fourth gear position pawl assembly 124D, a fifth gear position pawl assembly 124E, a sixth gear position pawl assembly 124F, a seventh gear position pawl assembly 124G and an eighth gear position pawl assembly 124I.

Figure 20:
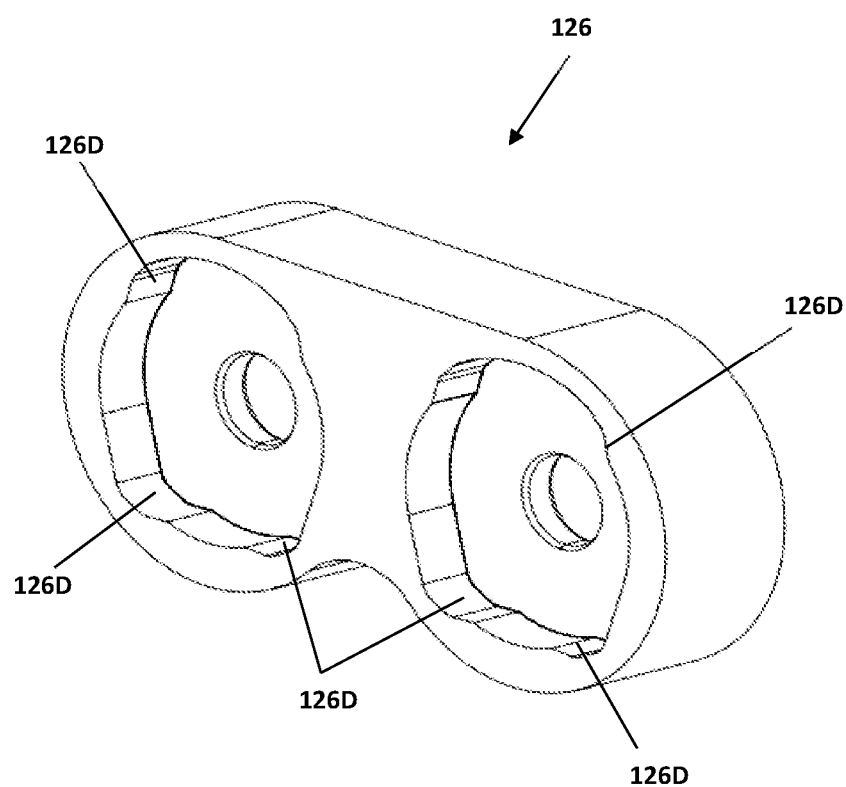
FIG. 20 depicts a perspective view of a pawl kicker means, according to an embodiment of the invention as disclosed herein.

FIG. 20 depicts a perspective view of a pawl kicker means (126), according to an embodiment of the invention as disclosed herein. Each pawl kicker means 126 includes a plurality of pawl dis-engaging portions 126D (timed pawl dis-engaging teeth). The plurality of pawl kicker means 126 includes a first pawl kicker means 126A and a second pawl kicker means 126B.

The plurality of shift rails 128 include a first and fifth gear position shift rail 128A, a second and sixth gear position shift rail 128B, a third and seventh gear position shift rail 128C and a fourth and eighth gear position shift rail 128D.

Figure 21:
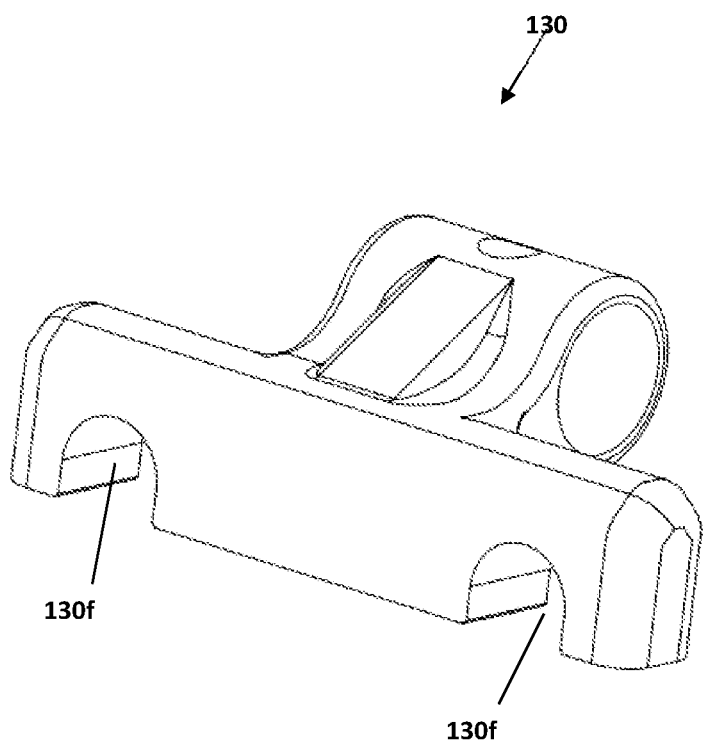
FIG. 21 depicts a perspective view of a shift rail-end, according to an embodiment of the invention as disclosed herein.
Figure 22:
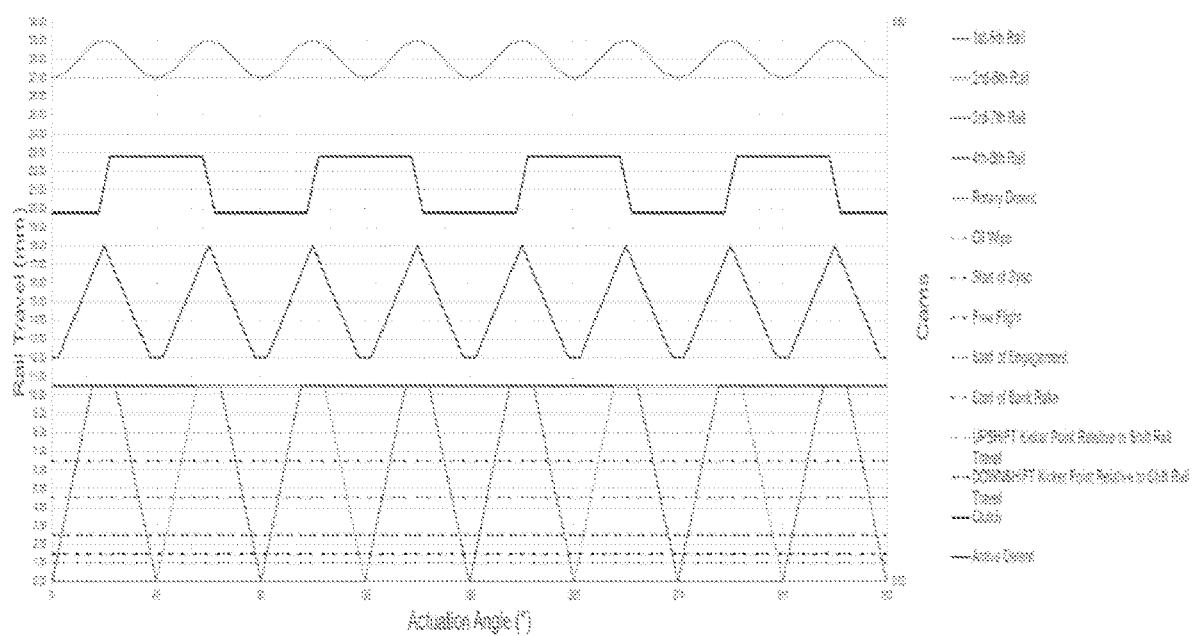
FIG. 22 depicts a timing graph of the transmission control mechanism, according to an embodiment of the invention as disclosed herein.
Figure 25:
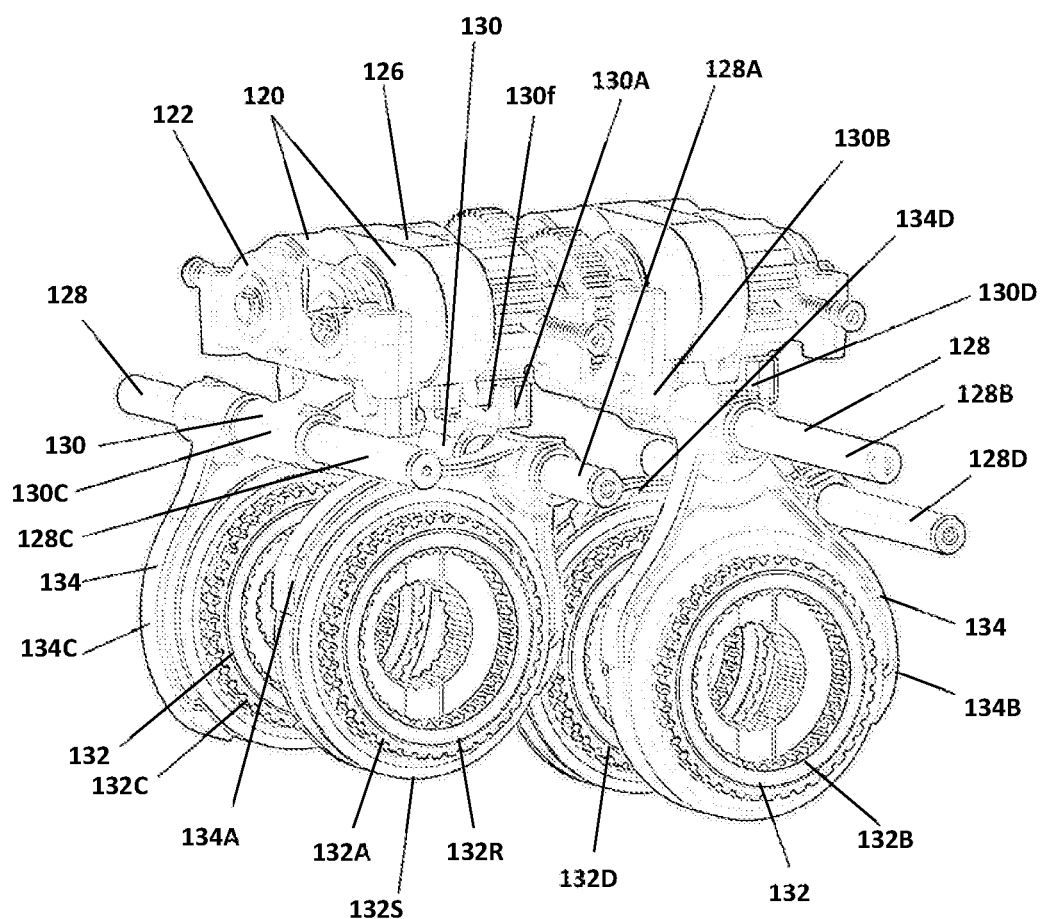
FIG. 25 depicts the shift rails, shift rail-ends and synchronizer units, according to an embodiment of the invention as disclosed herein.

FIG. 21 depicts a perspective view of a shift rail-end (130), according to an embodiment of the invention as disclosed herein. FIG. 25 depicts shift rails 128, shift rail-ends 130 and synchronizer units 132, according to an embodiment of the invention as disclosed herein. Each shift rail-end 130 defines a plurality of rail shifter means shift finger receiving portions 130f, where each means shift finger receiving portions 130f of each shift rail-end 130 is adapted to receive the shift finger 120F of corresponding rail shifting means 120 thereby connecting corresponding rail shifting means 120 to corresponding shift rail-end 130. The plurality of shift rail-ends 130 include a first and fifth gear position shift rail-end 130A, a second and sixth gear position shift rail-end 130B, a third and seventh gear position shift rail-end 130C and a fourth and eighth gear position shift rail-end 130D. The first and fifth gear position shift rail-end 130A is removably connected to the first and fifth gear position shift rail 128A at a predetermined position. The second and sixth gear position shift rail-end 130B is removably connected to the second and sixth gear position shift rail 128B at a predetermined position. The third and seventh gear position shift rail-end 130C is removably connected to the third and seventh gear position shift rail 128C at a predetermined position. The fourth and eighth gear position shift rail-end 130D is removably connected to the fourth and eighth gear position shift rail 128D at a predetermined position.

The plurality of synchronizers units 132 includes first and fifth gear position synchronizers unit 132A, second and sixth gear position synchronizers unit 132B, third and seventh gear position synchronizers unit 132C, and a fourth and eighth gear position 132D.

Each shift fork 134 includes a plurality of lugs adapted to be connected to the synchronizer sleeve (132S) of corresponding synchronizer unit 132. The plurality of shift fork 134 include a first and fifth gear position shift fork 134A, a second and sixth gear position shift fork 134B, a third and seventh gear position shift fork 134C and a fourth and eighth gear position shift fork 134D. The first and fifth gear position shift rail fork 134A is removably connected to the first and fifth gear position shift rail 128A at a predetermined position, and engaged with the synchronizer sleeve (132S) of the first and fifth gear position synchronizers unit 132A. The second and sixth gear position shift fork 134B is removably connected to the second and sixth gear position shift rail 128B at a predetermined position, and engaged with the synchronizer sleeve (132S) of the second and sixth gear position synchronizers unit 132B. The third and seventh gear position shift fork 134C is removably connected to the third and seventh gear position shift rail 128C at a predetermined position, and engaged with the synchronizer sleeve (132) of the third and seventh gear position synchronizers unit 132C. The fourth and eighth gear position shift rail fork 134D is removably connected to the fourth and eighth gear position shift rail 128D at a predetermined position, and engaged with the synchronizer sleeve (132S) of the fourth and eighth gear position 132D.

The lever position control valve assembly 136 is provided in fluid communication with the master clutch control valve assembly 100M and the active detent control valve assembly 138.

Figure 26:
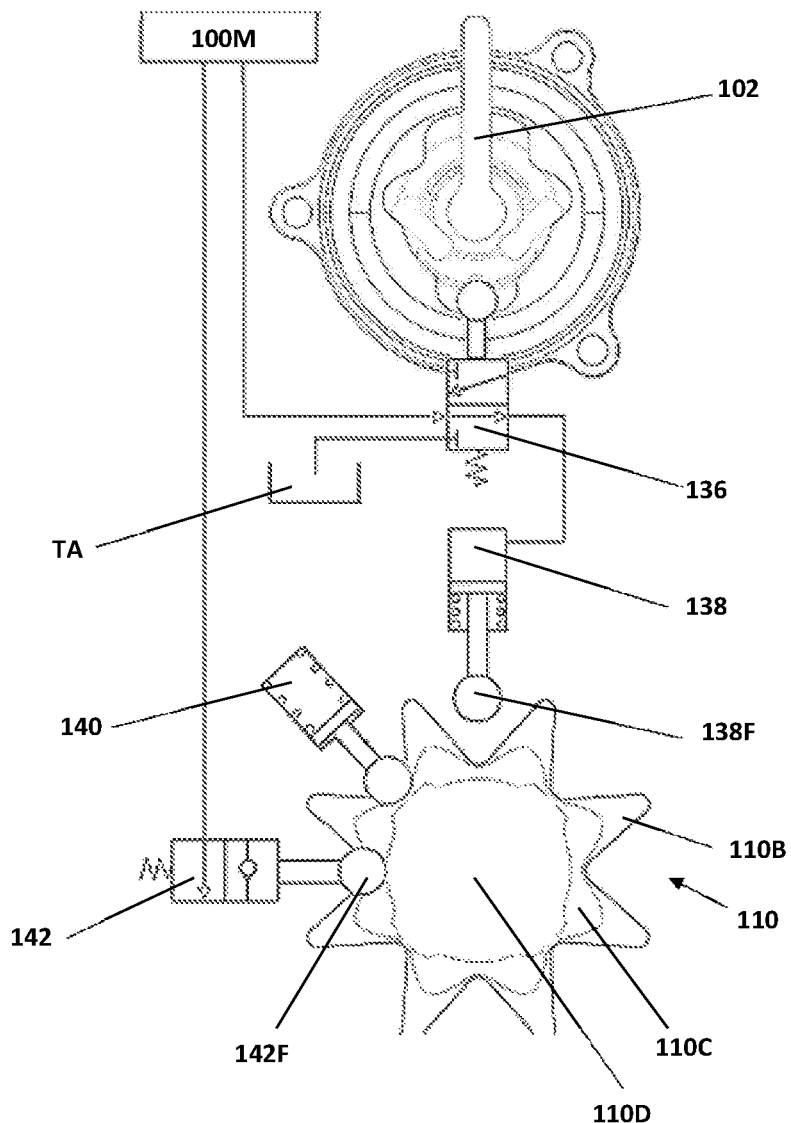
FIG. 26 depicts an active detent control valve assembly in fluid communication with a master clutch control valve assembly and a tank through a lever position control valve assembly, according to an embodiment of the invention as disclosed herein.

FIG. 26 depicts an active detent control valve assembly 138 in fluid communication with a master clutch control valve assembly 100M and a tank TA through a lever position control valve assembly 136, according to an embodiment of the invention as disclosed herein. The active detent control valve assembly 138 is provided in fluid communication with the master clutch control valve assembly 100M and the tank TA through the lever position control valve assembly 136.

The clutch selection control valve assembly 142 is provided in fluid communication with at least one of the master clutch control valve assembly 100M.

The master clutch control valve assembly 100M is provided in fluid communication with the active detent control valve assembly 138 through the lever position control valve assembly 136. The master clutch control valve assembly 100M is provided in fluid communication with the clutch selection control valve assembly 142.

| Pawl Pos'n | Driving Gear | U'shift | Angle | D'shift |
|---|---|---|---|---|
| 0 (16) | 8th | 7th D/S | 0 | 1st D/S |
| 1 | | 1st P/S | 22.5 | 8th P/S |
| 2 | 1st | 8th D/S | 45 | 2nd D/S |
| 3 | | 2nd P/S | 67.5 | 1st P/S |
| 4 | 2nd | 1st D/S | 90 | 3rd D/S |
| 5 | | 3rd P/S | 112.5 | 2nd P/S |
| 6 | 3rd | 2nd D/S | 135 | 4th D/S |
| 7 | | 4th P/S | 157.5 | 3rd P/S |
| 8 | 4th | 3rd D/S | 180 | 5th D/S |
| 9 | | 5th P/S | 202.5 | 4th P/S |
| 10 | 5th | 4th D/S | 225 | 6th D/S |
| 11 | | 6th P/S | 247.5 | 5th P/S |
| 12 | 6th | 5th D/S | 270 | 7th D/S |
| 13 | | 7th P/S | 292.5 | 6th P/S |
| 14 | 7th | 6th D/S | 315 | 8th D/S |

-continued

| Pawl Pos'n | Driving Gear | U'shift | Angle | D'shift |
|---|---|---|---|---|
| 15 | | 8th P/S | 337.5 | 7th P/S |
| 16 (0) | 8th | 7th D/S | 360 | 1st D/S |

The working of the transmission control mechanism 100 during upshifting to second gear is follows. The shift finger 120F of said second rail shifting means 120 is moved to a predefined angle therein to move the second and sixth shift rail 128B in a predefined direction to enable movement of the second and sixth gear position shift fork 134B and the synchronizer sleeve of the second and sixth synchronizer unit 132B to move from neutral position to second gear position in a direction towards the second drive gear therein to enable engagement of synchronizer sleeve with second drive gear synchronizer ring (132R) of second and sixth synchronizer unit 132B thereby facilitating engagement (pre-selection) of second drive gear when the shifter arm 106 is moved at a predefined angle (0 to 13.5 degree), and the pawl disengaging portions (internal teeth) of said pawl kicker plate is adapted to move the locking portion 124j of at least one of said pawl 124P of said second gear position rail shifting means 120b away from corresponding pawl locking portion 120P (internal teeth) of said second rail shifting means 120 when the shifter arm is moved to a predefined angle (13.5 5 to 17.5 degree), and the cam follower of the cam selection valve assembly 142 engages the second gear position portion of the clutch selection cam 110D which in turn allows the master clutch control valve assembly 100M to actuate even clutch unit E (as shown in FIG. 24) when the shifter arm 106 is moved to a predefined angle (20 to 25 degree) on engagement of the transmission shift lever 102 (gear shift lever) adapted to be upshifted to a second gear preselect position. said position lever control valve assembly 136 provides pressurized hydraulic fluid from the master clutch control valve assembly 100M to said active detent control valve assembly 138 thereby moving the cam follower 138F of said an active detent control valve assembly 138 in direction towards said active detent cam 110B of said input shift ratchet and cam assembly 110 thereby moving said fifth pawl assembly 124 at a predefined angle when said shifter arm 106 is at a predefined angle (27.5 to 41 degree) therein to enable the locking portion 124j of at least one of said pawl 124P of said fifth gear position rail shifting means 120e to engage with corresponding pawl locking portion 120P (internal teeth) of said fifth rail shifting means 120 to move the shift finger 120F at a predefined angle which in turn moves first and fifth gear position shift rail 128 in a predefined direction therein to enable movement of said first and fifth gear position shift fork 134A and the synchronizer sleeve (132S) of first and fifth synchronizer unit from first gear position to neutral position in a direction away from the first drive gear therein to dis-engage the synchronizer sleeve (132S) from the synchronizer ring (132R) of first and fifth synchronizer unit thereby facilitating dis-engagement of first drive gear when the shift ratchet 108A is at a predefined angle (27.5 to 41 degree) therein to enable actuation of second drive gear, and the pawl disengaging portions (internal teeth) of said pawl kicker plate is adapted to move the locking portion 124j of at least one of said pawl 124P of said fifth gear position rail shifting means 120e away from corresponding pawl locking portion 120P (internal teeth) of said fifth rail shifting means 120 when the shift ratchet is moved to a predefined angle (41 to 45 degree). The working principle for other gears remains same with respect to the table. Therefore, an hydro-mechanical transmission control mechanism 100 is provided for a power transmission unit in a vehicle.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

We claim:

1. A transmission control mechanism (100) in a manual dual clutch power transmission unit (10), said transmission control mechanism (100) comprising:
  a shifter arm (106) having a base (106A) adapted to be movably connected to a transmission shift lever (102), a first portion (106B) transversely extending from the base (106A), and a second portion (106C) disposed above the first portion (106B);
  an input shift ratchet and cam assembly (110) comprising a shift ratchet (110A) having a plurality of pawl locking portions (110a) and a shaft (110b); an active detent cam (110B); a rotary detent cam (110C); and a clutch selection cam (110D);
  an input ratchet shifting assembly (108) comprising a pawl housing (108H) defining a shaft (108a) adapted to be movably connected to the second portion (106C) of said shifter arm (106), a plurality of resilient member receiving portions (108c), a plurality of pawl receiving portions (108d), a plurality of pawl locking member receiving portions (108e) and a gear shift lever position cam (108b); a plurality of resilient means (108S), where at least a portion of each of said resilient means (108S) is adapted to be received by corresponding resilient member receiving portions (108c) of said pawl housing (108H); a plurality of pawls (108P) adapted to be received by corresponding pawl receiving portions (108d) thereby loading said pawls (108P) into said pawl housing (108H), where each of said pawls (108P) defines a locking portion (108j) adapted to be movably connected to said shift ratchet (110A) of said input shift ratchet and cam assembly (110), and a locking member receiving portion (108k); and a plurality of pawl locking elements (108L) adapted to be received by corresponding pawl locking member receiving portions (108e) of said pawl housing (108H) and the locking member receiving portion (108k) of corresponding said pawls (108P) thereby facilitating engagement of corresponding pawls (108P) with the pawl housing (108H);
  a drive shaft (112) adapted to be rotatably connected to the shaft (110b) of said shift ratchet (110A) of said input shift ratchet and cam assembly (110);
  a driven shaft (114) adapted to be rotatably connected to said drive shaft (112);
  a plurality of shift rails (128) provided at corresponding predetermined positions and at a predetermined distance from each other, said plurality of shift rails (128)

comprising a first and fifth gear position shift rail (128A), a second and sixth gear position shift rail (128B), a third and seventh gear position shift rail (128C), and a fourth and eighth gear position shift rail (128D);

a plurality of rail shifting means (120) adapted to be mounted onto corresponding said drive shaft (112) and said driven shaft (114) through corresponding plurality of bushes (121) at corresponding predetermined positions, said plurality of rail shifting means (120) comprising a first gear position rail shifting means (120a), a second gear position rail shifting means (120b), a third gear position rail shifting means (120c), a fourth gear position rail shifting means (120d), a fifth gear position rail shifting means (120e), a sixth gear position rail shifting means (120f), a seventh gear position rail shifting means (120g), and an eighth gear position rail shifting means (120h), where each of said rail shifting means (120) defines a plurality of pawl locking portions (120P) and a shift finger (120F);

a plurality of shift rail-ends (130) comprising a first and fifth gear position shift rail-end (130A) adapted to be removably connected to said first and fifth gear position shift rail (128A) at a predetermined position, a second and sixth gear position shift rail-end (130B) adapted to be removably connected to said second and sixth gear position shift rail (128B) at a predetermined position, a third and seventh gear position shift rail-end (130C) adapted to be removably connected to said third and seventh gear position shift rail (128C), and a fourth and eighth gear position shift rail-end (130D) adapted to be removably connected to said fourth and eighth gear position shift rail (128D), where each of said shift rail-end (130) defines a plurality of rail shifting means shift finger receiving portions (130f) adapted to receive the shift finger (120F) of corresponding at least two of said rail shifting means (120) thereby connecting said rail shifting means (120) to corresponding said shift rail-end (130) respectively;

a plurality of synchronizer units (132) comprising a first and fifth gear position synchronizer unit (132A), a second and sixth gear position synchronizer unit (132B), a third and seventh gear position synchronizer unit (132C), and a fourth and eighth gear position synchronizer unit (132D), each of said synchronizer unit (132) having a synchronizer sleeve (132S) and a plurality of synchronizer rings (132R);

a plurality of shift forks (134) comprising a first and fifth gear position shift fork (134A) adapted to be removably connected to said first and fifth gear position shift rail (128A) at a corresponding predetermined position and engaged with the synchronizer sleeve (132S) of said first and fifth synchronizer sleeve (132S), a second and sixth gear position shift fork (134B) adapted to be removably connected to said second and sixth gear position shift rail (128B) at a corresponding predetermined position and engaged with the synchronizer sleeve (132S) of said second and sixth gear position synchronizer unit (132B), a third and seventh gear position shift fork (134C) adapted to be removably connected to third and seventh gear position shift rail (128C) at a corresponding predetermined position and engaged with the synchronizer sleeve (132S) of said third and seventh gear position synchronizer unit (132C), and a fourth and eighth gear position shift fork (134D) adapted to be removably connected to fourth and eighth gear position shift rail (128D) at a corresponding predetermined position and engaged with the synchronizer sleeve (132S) of said fourth and eighth gear position (132D);

a plurality of pawl kicker means (126) comprising a first pawl kicker means (126A) and a second pawl kicker means (126B), each of said first pawl kicker means (126A) defines a plurality of timed pawl dis-engaging portions (126D);

a plurality of pawl assemblies (124) adapted to be rotatably mounted onto corresponding said drive shaft (112) and said driven shaft (114) at corresponding predetermined positions, said plurality of pawl assemblies (124) comprising a first gear position pawl assembly (124A), a second gear position pawl assembly (124B), a third gear position pawl assembly (124C), a fourth gear position pawl assembly (124D), a fifth gear position pawl assembly (124E), a sixth gear position pawl assembly (124F), a seventh gear position pawl assembly (124G) and an eighth gear position pawl assembly (124I), where each of said pawl assembly (124) comprising a pawl housing (124H) defining a plurality of resilient member receiving portions (124c), a plurality of pawl receiving portions (124d), a plurality of pawl locking member receiving portions (124e); a plurality of resilient means (124S), where at least a portion of each of said resilient means (124S) is adapted to be received by corresponding resilient member receiving portion (124c) of said pawl housing (124H); and a plurality of pawls (124P) adapted to be received by corresponding pawl receiving portions (124d) thereby loading said pawls (124P) into said pawl housing (124H), where a portion of at least one of said pawl (124P) of said pawl assembly (124) is movably engaged with corresponding said rail shifting means (120) and another portion of at least one of said pawl (124P) of said pawl assembly (124) is movably engaged with corresponding said pawl kicker means (126);

a lever position control valve assembly (136), said lever position control valve assembly (136) adapted to be engaged with gear shift lever position cam (108b) of said pawl housing (108H) of said input ratchet shifting assembly (108) through a lever position valve lever (144);

an active detent control valve assembly (138) adapted to be provided in fluid communication with a tank (TA) through said lever position control valve assembly (136) during a predefined operating condition, said active detent control valve assembly (138) comprising a cam follower (138F) adapted to be selectively engaged with said active detent cam (110B);

a master clutch control valve assembly (100M) adapted to be provided in fluid communication with said active detent control valve assembly (138) through said lever position control valve assembly (136), said master clutch control valve assembly (100M) is provided in fluid communication with at least one of a dual clutch unit (10D), said lever position control valve assembly (136), said active detent control valve assembly (138), said clutch selection control valve assembly (142) and said tank (TA); and a clutch selection control valve assembly (142) adapted to be provided in fluid communication with at least one of said master clutch control valve assembly (100M) and the tank (TA), said clutch selection control valve assembly (142) comprising a cam follower (142F) adapted to be engaged with said clutch selection cam (110D), wherein each of said pawl (124P) of each of said pawl assembly (124) adapted to be movably connected to corresponding said rail shifting means (120), and corresponding pawl kicker means (126);

the shift finger (120F) of said second rail shifting means (120) is moved to a predefined angle therein to move the second and sixth shift rail (128B) in a predefined direction to enable movement of the second and sixth gear position shift fork (134B) and the synchronizer sleeve (132S) of the second and sixth synchronizer unit (132B) to move from a neutral position to a second gear position thereby facilitating pre-selection of a second drive gear when the shifter arm (106) is moved at a predefined angle, and the pawl disengaging portions (126D) of said pawl kicker means (126) is adapted to move the locking portion (124j) of at least one of said pawl (124P) of said second gear position rail shifting means (120b) away from the corresponding pawl locking portion (120P) of said second rail shifting means (120) when the shifter arm (106) is moved to the predefined angle, and the cam follower of the cam selection valve assembly (142) engages the second gear position portion of the clutch selection cam (110D) which in turn allows the master clutch control valve assembly (110M) to actuate an even clutch unit (E) of the dual clutch unit (10D) when the shifter arm (106) is moved to a predefined angle on engagement of the transmission shift lever (102) adapted to be upshifted to a second gear preselect position; and said position lever control valve assembly (136) provides pressurized hydraulic fluid from the master clutch control valve assembly (100M) to said active detent control valve assembly (138) thereby moving the cam follower (138F) of said active detent control valve assembly (138) in a direction towards said active detent cam (110B) of said input shift ratchet and cam assembly (110) thereby moving said fifth pawl assembly (124) at a predefined angle when said shifter arm (106) is at a predefined angle therein to enable the locking portion (124j) of at least one of said pawl (124P) of said fifth gear position rail shifting means (120e) to engage with corresponding pawl locking portion (120P) of said fifth rail shifting means (120) to move the shift finger (120F) at a predefined angle which in turn moves the first and fifth gear position shift rail (128) in a predefined direction therein to enable movement of said first and fifth gear position shift fork (134A) and the synchronizer sleeve (132S) of first and fifth synchronizer unit (132A) from a first gear position to a neutral position thereby facilitating dis-engagement of a first drive gear when the shift ratchet (108A) is at a predefined angle therein to enable actuation of the second drive gear, and the pawl disengaging portions of said pawl kicker means (126) is adapted to move the locking portion (124j) of at least one of said pawl (124P) of said fifth gear position rail shifting means (120e) away from corresponding pawl locking portion (120P) of said fifth rail shifting means (120) when the shift ratchet (110A) is moved to a predefined angle.

2. The transmission control mechanism (100) as claimed in claim 1, wherein said transmission shift lever (102) is a mono-stable gear shift lever, where said transmission shift lever (102) is provided with a Z-gate sequential gear shift pattern.

3. The transmission control mechanism (100) as claimed in claim 1, further comprising a shift gate element (104) having a shift gate (104G) defining an up shift gate (104U) adapted to facilitate up shift movement of said transmission shift lever (102), and a downshift gate (104D) adapted to facilitate downshift movement of said transmission shift lever (102), wherein the up shift gate (104U) and the downshift gate (104D) of the shift gate (104G) defines a shift lever initial position in between each other.

4. The transmission control mechanism (100) as claimed in claim 3, wherein the shift gate (104G) of said shift gate element (104) defines a Z-gate shift pattern.

5. The transmission control mechanism (100) as claimed in claim 1, further comprising a gear shift lever support arrangement (103) adapted to support said transmission shift lever (102).

6. The transmission control mechanism (100) as claimed in claim 1, wherein said shifter arm (106) is movably connected to said transmission shift lever (102) through a gear shift lever support arrangement (103).

7. The transmission control mechanism (100) as claimed in claim 1, further comprising a gear shift lever auto-return mechanism (105) adapted to move said transmission shift lever (102) automatically to an initial shift lever position.

8. The transmission control mechanism (100) as claimed in claim 1, wherein the plurality of pawl locking portions (110a) of said shift ratchet (110A) of said input shift ratchet and cam assembly (110) includes a first gear position pawl locking portion (110a1), a second gear position pawl locking portion (110a2), a third gear position pawl locking portion (110a3), a fourth gear position pawl locking portion (110a4), a fifth gear position pawl locking portion (110a5), a sixth gear position pawl locking portion (110a6), a seventh gear position pawl locking portion (110a7) and an eighth gear position pawl locking portion (110a8), where the plurality of pawl locking portions (110a) of said shift ratchet (110A) are provided at corresponding predetermined positions.

9. The transmission control mechanism (100) as claimed in claim 1, wherein the plurality of pawl locking portions (110a) of said shift ratchet (110A) of said input shift ratchet and cam assembly (110) is a plurality of internal teeth.

10. The transmission control mechanism (100) as claimed in claim 1, wherein the plurality of pawl locking portions (110a) of said shift ratchet (110A) includes a first gear position pawl locking portion (110a1), a second gear position pawl locking portion (110a2), a third gear position pawl locking portion (110a3), a fourth gear position pawl locking portion (110a4), a fifth gear position pawl locking portion (110a5), a sixth gear position pawl locking portion (110a6), a seventh gear position pawl locking portion (110a7) and an eighth gear position pawl locking portion (110a8).

11. The transmission control mechanism (100) as claimed in claim 1, wherein said active detent cam (110B) defines a plurality of gear position portions (110Y) provided at corresponding predetermined positions, wherein the plurality of gear position portions (110Y) is a plurality of detents or a plurality of undercuts.

12. The transmission control mechanism (100) as claimed in claim 11, wherein plurality of gear position portions (110Y) of said active detent cam (110B) defines a first gear position portion (110Y1), a second gear position portion (110Y2), a third gear position portion (110Y3), a fourth gear position portion (110Y4), a fifth gear position portion (110Y5), a sixth gear position portion (110Y6), a seventh gear position portion (110Y7) and an eighth gear position portion (110Y8).

13. The transmission control mechanism (100) as claimed in claim 1, wherein said drive shaft (112) is rotatably connected to the shaft (110b) of said shift ratchet (110A) of said input shift ratchet and cam assembly (110) through a coupler (115).

14. The transmission control mechanism (100) as claimed in claim 1, wherein said driven shaft (114) is rotatably connected to said drive shaft (112) through a driven shaft driven gear (118) and a driven shaft drive gear (116), where said driven shaft driven gear is rotatably mounted onto said driven shaft (114) at a predetermined position, and said driven shaft drive gear is rotatably mounted onto said drive shaft (112) to drive said driven shaft driven gear to drive said driven shaft (114).

\* \* \* \* \*